United States Patent

Higuchi et al.

[11] Patent Number: 5,817,728
[45] Date of Patent: Oct. 6, 1998

[54] PREPARATION OF DEGRADABLE COPOLYMERS

[75] Inventors: Chojiro Higuchi; Hiroshi Suizu; Masatoshi Takagi; Takeshi Kashima; Yuji Terado; Ikumi Kitada; Masanobu Ajioka; Akihiro Yamaguchi, all of Kanagawa-ken; Taiji Kameoka, Chiba-ken, all of Japan

[73] Assignee: Mitsui Chemicals, Inc., Tokyo, Japan

[21] Appl. No.: 610,240

[22] Filed: Mar. 4, 1996

[30] Foreign Application Priority Data

Mar. 16, 1995 [JP] Japan .................................. 7-057523
May 31, 1995 [JP] Japan .................................. 7-133517
Sep. 14, 1995 [JP] Japan .................................. 7-237126
Sep. 22, 1995 [JP] Japan .................................. 7-244833

[51] Int. Cl.$^6$ ............................. C08B 3/00; C08B 13/00; C08G 63/664
[52] U.S. Cl. .......................... 527/300; 527/311; 527/315; 525/54.2; 525/54.21; 525/54.24; 525/54.3; 525/54.31
[58] Field of Search ................................ 527/300, 311, 527/315; 525/54.2, 54.21, 54.24, 54.3, 54.31

[56] References Cited

U.S. PATENT DOCUMENTS 5,191,016  3/1993  Yalpani ................................... 525/54.2
5,247,013  9/1993  Shinoda et al. ......................... 525/54.2
5,310,865  5/1994  Enomoto et al. ....................... 528/361

FOREIGN PATENT DOCUMENTS 0615166    9/1994  European Pat. Off. .
6-287279  10/1994  Japan .
2145422    3/1985  United Kingdom .
WO87/06241 10/1987  WIPO .
WO96/20220  7/1996  WIPO .

*Primary Examiner*—Nathan M. Nutter
*Attorney, Agent, or Firm*—Burns, Doane, Swecker & Mathis, L.L.P.

[57] ABSTRACT

A preparation process of a degradable copolymer comprising carrying out dehydration polycondensation of polysaccharide (A) with one or more compounds (B) selected from the group consisting of:

(b1) hydroxycarboxylic acid,
(b2) polyhydroxycarboxylic acid,
(b3) aliphatic polyhydric alcohol and aliphatic polybasic acid, and
(b4) aliphatic polyester derived from aliphatic polyhydric alcohol and aliphatic polybasic acid.

A copolymer having a high molecular weight, excellent toughness, transparency and heat resistance, and additionally having a high melt tension can be obtained with a reaction time less than a half of the conventional process. The copolymer obtained by the invention is a material suited for injection molding, extrusion, calendaring, blow forming, balloon forming, vacuum forming and foaming. Particularly, the copolymer obtained by the invention has a high melt tension and thus the molten copolymer is difficult to sag and flow and can be processed with ease into foams and blow bottles.

7 Claims, 1 Drawing Sheet

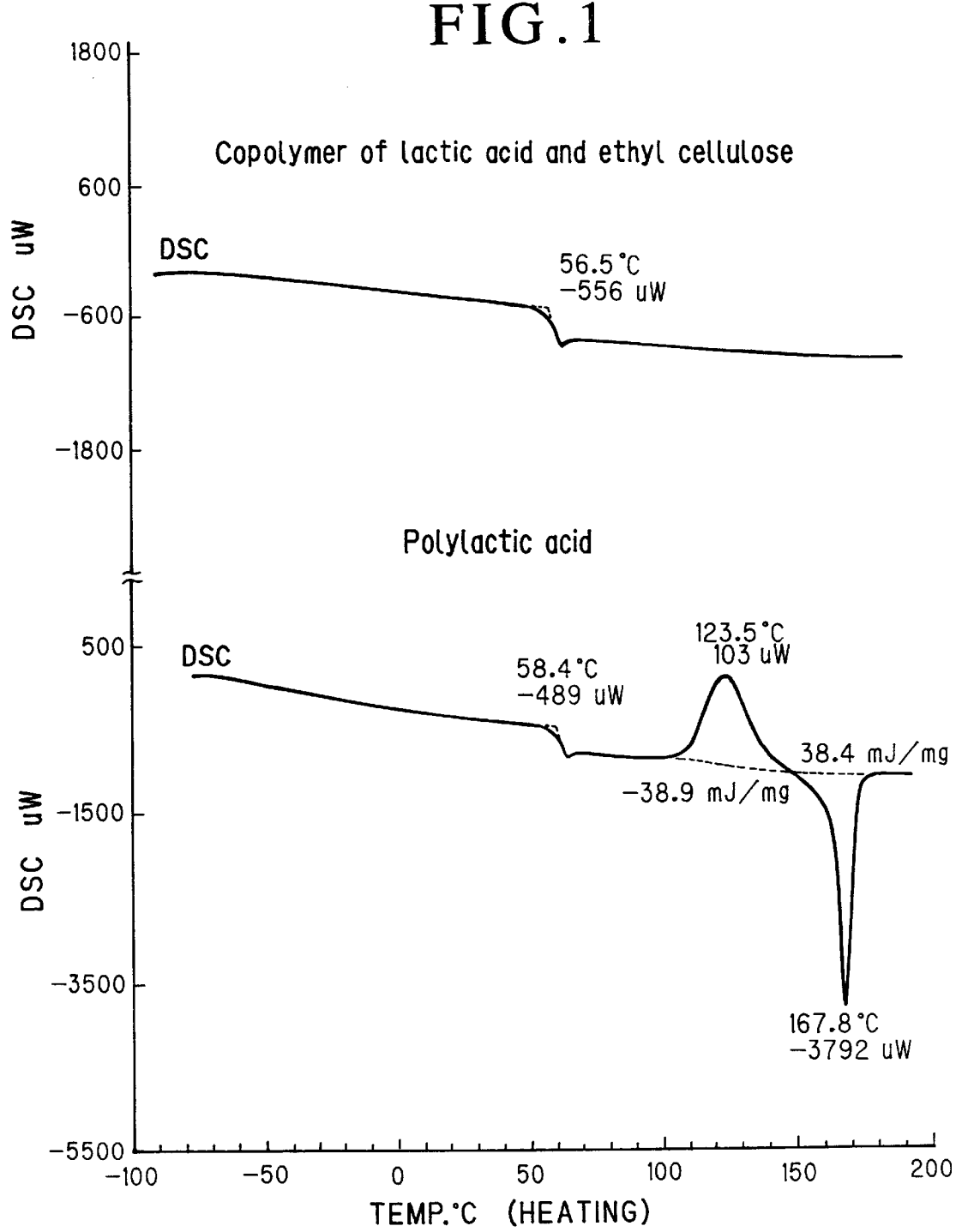

PREPARATION OF DEGRADABLE COPOLYMERS

BACKGROUND OF THE INVENTION

1) Field of the Invention

The present invention relates to a preparation process of a degradable copolymer comprising carrying out a dehydration polycondensation reaction of polysaccharide (A) with one or more compounds (B) selected from the group consisting of:

(b1) hydroxycarboxylic acid, (b2) polyhydroxycarboxylic acid, (b3) aliphatic polyhydric alcohol and aliphatic polybasic acid, and (b4) aliphatic polyester derived from aliphatic polyhydric alcohol and aliphatic polybasic acid.

The copolymer which can be obtained by the preparation process of the invention has good degradability and transparency and can be processed into a film, sheet, filament, yarn, textile, foam and other formed items. Particularly, the copolymer which can be obtained by the preparation process of the invention has a higher melt tension as compared with polyhydroxycarboxylic acid obtained by polycondensation of hydroxycarboxylic acid or aliphatic polyester obtained by polycondensation of aliphatic polyhydric alcohol and aliphatic polybasic acid. Thus, the copolymer is resistant to sag and flow in the molten state, and is very suited for foaming and blow molding, and these formed items are useful for a medical material and substitute for general purpose resins.

2) Description of Related Art

In recent years, waste disposal has become a problem in connection with environmental protection. Specifically, in the case of using formed items and workpieces of high polymer materials for landfill waste, these articles cause problems because they have no property of degradation or disintegration by microorganisms and semipermanently remain in soil as extraneous matter, or they contaminate the environment by elution of plasticizer and other additives. Further, in the case of incinerating these articles as refuse, damage of the incinerator by a great quantity of heat generated by combustion and numerous ill effects of discharged smoke and exhaust gas on the atmospheric pollution, warming of the earth's atmosphere and acid rain have been highlighted.

In view of these situation, a high polymer material having excellent heat resistance, degradability and toughness at the same time has been strongly desired. Nevertheless, it has been difficult to provide a high polymer material which can conform to such demands.

Conventionally, polyhydroxycarboxylic acid and polysaccharide have a characteristic of hydrolyzing with ease in the presence of water. When these resins are used for a general purpose resin, they degrade without contaminating the environment after waste disposal. When these resins are left in a living body as a medical material, they are degraded and absorbed in the living body without giving toxicity to the living body after attaining the object, and are thus compatible for the living body. These excellent properties have already recieved attention before filing the invention.

However, in the case of processing into molded articles or formed items such as a film and filament, polylactic acid has a characteristic of transparency and problems of brittleness, high hardness, lack of flexibility and low melt viscosity. Acetyl cellulose can be used for a cigarette filter and photographic base film and has a problem of requiring a great amount of plasticizer.

In view of the technical background set forth above, techniques have been developed in order to solve these problems. For example, a polyfunctional, central compound has been subjected to a ring-opening polymerization of a cyclic monomer such as a lactide, that is, the cyclic dimer of lactic acid or lactone, for example, $\epsilon$-caprolactone. As the result, a plurality of degradable high molecular weight side chains are radially added to the above central compound.

For example, BP 2,145,422 has disclosed a technique for preparing a high polymer by adding polylactic acid or polyhydroxycarboxylic acid as a side chain to hydroxyl groups of polyol (a hydrocarbon compound having a plurality of hydroxyl groups in a molecule) such as sugar or sugar alcohol.

More specifically, the technique disclosed is to prepare an ester compound having a side chain composed of polylactic acid or copolylactic acid having a molecular weight of 5,000 or more by ring-opening polymerization of a cyclic dimer of hydroxycarboxylic acid such as lactide or glycolide on one or more hydroxyl groups of polyol such as glucose having a molecular weight of 20,000 or less. The ester compound thus obtained has been described to be particularly suited for use in pharmaceutical depot-containing pharmacologically active agents.

Japanese Laid-Open Patent Hei 6-287279 has disclosed a preparation process for a lactide-type copolymer by reacting lactide with cellulose ester or cellulose ether. By the technique, lactide, that is, the dimer of lactic acid and cellulose ester or cellulose ether is subjected to ring-opening graft copolymerization in the presence of an esterification catalyst to obtain a lactide-type copolymer having sufficient transparency, melting point required for molding resin, and suitable glass transition temperature. The lactide-type graft copolymer thus obtained has also been described to have excellent transparency, degradability, thermoplasticity and laminating property.

The technique which has been known before filing the present invention is to radially add two or more degradable high molecular weight side-chains to the above central compound by carrying out a ring-opening polymerization reaction of lactide and other dimers of hydroxycarboxylic acid or $\epsilon$-caprolactone and other cyclic esters of hydroxycarboxylic acid on the polyfunctional, central compound.

On the other hand, a technique for conducting a direct polymerization of lactic acid or other hydroxycarboxylic acid on the polyfunctional, central compound without passing through the dimer to radially graft two or more high molecular weight side chains on the above central compound has not been known before filing the invention. Such technique does not require high-priced cyclic monomers, can greatly simplify manufacturing steps, and is expected to carry out low cost production.

SUMMARY OF THE INVENTION

The present inventors have already disclosed in U.S. Pat. No. 5,310,865 a technique for preparing high molecular weight polyhydroxycarboxylic acid by direct dehydration polycondensation of hydroxycarboxylic acid without using a cyclic compound such as lactide, glycolide and $\epsilon$-caprolactone, and a technique for preparing a film, yarn and other processed products which contain said hydroxycarboxylic acid and have high strength.

In view of the problems concerning the conventional technique for adding high molecular weight side chains to the above polyfunctional central compound, the present inventors have carried out an intensive investigation by further developing and applying the technical concept which was the foundation of the invention disclosed in U.S. Pat. No. 5,310,865. As a result, the inventors have found that a copolymer which has high molecular weight polyester side chains and is extremely excellent in strength and degradability can be obtained by direct dehydration polycondensation of hydroxycarboxylic acid such as lactic acid or aliphatic polyhydric alcohol and aliphatic polybasic acid on the polyfunctional central compound of polysaccharide such as acetyl cellulose and ethyl cellulose. Thus, the present invention has been completed.

That is, one aspect of the invention is a preparation process for a degradable copolymer comprising carrying out a dehydration polycondensation reaction of polysaccharide (A) with one or more compounds (B) selected from the group consisting of (b1) hydroxycarboxylic acid, (b2) polyhydroxycarboxylic acid, (b3) aliphatic polyhydric alcohol and aliphatic polybasic acid, and (b4) aliphatic polyester derived from aliphatic polyhydric alcohol and aliphatic polybasic acid.

In the specification, the term hydroxycarboxylic acid, aliphatic polyhydric alcohol and aliphatic polybasic acid are referred to as monomer, and the term polyhydroxycarboxylic acid and aliphatic polyester derived from aliphatic polyhydric alcohol and aliphatic polybasic acid are referred to as polymer.

BRIEF DESCRIPTION OF THE DRAWINGS

FIG. 1 is a drawing illustrating the results of thermal analyses by DSC. The upper part illustrates results of a thermal analysis on a copolymer obtained in Example 16 and derived from L-lactic acid and ethyl cellulose. The lower part illustrates results of a thermal analysis on poly-L-lactic acid obtained in Comparative Example 1.

DETAILED DESCRIPTION OF THE INVENTION

The present invention is a process for preparing a copolymer efficiently and within a short time. The copolymer can be obtained by reacting saccharide with ($b_1$) hydroxycarboxylic acid, ($b_2$) polyhydroxycarboxylic acid, ($b_3$) aliphatic polyhydric alcohol and aliphatic polybasic acid, or ($b_4$) aliphatic polyester derived from aliphatic polyhydric alcohol and aliphatic polybasic acid. The copolymer thus obtained has high molecular weight hydroxycarboxylic acid units on the side chains of polysaccharide; or high molecular weight aliphatic polyhydric alcohol units and aliphatic polybasic acid units on the side chains of polysaccharide; or high molecular weight hydroxycarboxylic acid units, and high molecular weight aliphatic polyhydric alcohol units and aliphatic polybasic acid units on the side chains of polysaccharide. The copolymer obtained by the preparation process of the invention has a high molecular weight and high melting point, and is tough. Thus, the copolymer is a suitable material for processing such as injection molding, extrusion, calendaring, blow forming, balloon forming, blow molding, vacuum forming and foaming. Particularly, the copolymer obtained by the preparation process of the invention has a very high melt tension and is specifically effective for blow forming and foaming as compared with a homopolymer such as polyhydroxycarboxylic acid and aliphatic polyester derived from aliphatic polyhydric alcohol and aliphatic polybasic acid.

According to the invention, high molecular weight copolymer can be obtained with a reaction time less than half the conventional time by conducting a dehydration polycondensation of, for example, lactic acid or polylactic acid with cellulose ester such as acetyl cellulose or cellulose ether such as methyl cellulose and ethyl cellulose. Further, the copolymer obtained has excellent toughness, transparency and heat resistance which are essential properties of polylactic acid, and additionally has a high melt tension. Thus, the copolymer can be suitably processed into formed items such as foams and bottles.

According to the invention, high molecular weight copolymer can be obtained by reacting, for example, ethylene glycol or 1,4-butanediol and succinic acid with cellulose ester such as acetyl cellulose or cellulose ether such as methyl cellulose and ethyl cellulose. The copolymer obtained has excellent flexibility and heat resistance, and additionally has a high melt tension. Thus the copolymer can be suitably processed into formed items such as foams and bottles.

According to the invention, a high molecular weight copolymer can be obtained with a reaction time less than half the conventional time by reacting, for example, lactic acid with cellulose ester such as acetyl cellulose or cellulose ether such as methyl cellulose and ethyl cellulose, successively reacting polybutylene succinate or polyethylene succinate. The copolymer obtained is high in transparency, has flexibility and heat resistance, and is high in melt tension. Thus the copolymer can be suitably processed into formed items such as foams and bottles.

Hydroxycarboxylic acid which is used in the invention is aliphatic carboxylic acids having a hydroxyl group in the molecule. Exemplary carboxylic acids include lactic acid, glycolic acid, 3-hydroxybutyric acid, 4-hydroxybutyric acid, 3-hydroxyvaleric acid, 5-hydroxyvaleric acid, and 6-hydroxycaproic acid.

When an asymmetric carbon atom is present in a molecule, L-isomer and D-isomer can be used singly or as a mixture of these isomers, that is, a racemic compound. A mixture of one kind of hydroxycarboxylic acid with an other kind of hydroxycarboxylic acid can also be used, as a copolymer of lactic acid and glycolic acid being prepared by using a mixture of lactic acid and glycolic acid.

Polyhydroxycarboxylic acid used in the invention can be prepared by dehydration polycondensation of the above hydroxycarboxylic acid or by ring-opening polymerization of a cyclic dimer of hydroxycarboxylic acid, for example, lactide and glycolide or a cyclic ester of hydroxycarboxylic acid such as ε-caprolactone.

A copolymer obtained by polycondensation of one kind of hydroxycarboxylic acid with an other kind of hydroxycarboxylic acid can of course be used as polyhydroxycarboxylic acid in the invention.

No particular restriction is imposed upon the molecular weight of polyhydroxycarboxylic acid used in the invention. Consequently, a so-called oligomer having a polymerization degree of 100 or less can also be used in the invention.

In consideration of easy availability and cost of the raw materials, and physical properties of the copolymer obtained by the present invention, hydroxycarboxylic acid is preferably lactic acid and polyhydroxycarboxylic acid is preferably polylactic acid.

Aliphatic polyhydric alcohols which can be used in the invention have two or more hydroxyl groups in the molecule and include, for example, ethylene glycol, diethylene glycol, triethylene glycol, polyethylene glycol, propylene glycol, dipropylene glycol, 1,3-butanediol, 1,9-nonanediol, neopentyl glycol, polytetramethylene glycol, and 1,4- cyclohexanedimethanol. These polyhydric alcohols can be used singly or as a mixture.

When an asymmetric carbon atom is present in a molecule, D-isomer or L-isomer of aliphatic polyhydric alcohol can be individually used singly or can also be used as a mixture, that is, a racemic compound.

Aliphatic polybasic acids which can be used in the invention have two or more carboxyl groups in a molecule and include, for example, succinic acid, oxalic acid, malonic acid, glutaric acid, adipic acid, pimelic acid, suberic acid, azelaic acid, sebacic acid, undecanoic diacid and dodecanoic diacid. These acids can be used singly or as a mixture.

When an asymmetric carbon atom is present in a molecule, D-isomer and L-isomer of aliphatic polybasic acid can be used singly or as a mixture, that is, a racemic compound.

In order to prepare a soft copolymer in the invention, aliphatic polyhydric alcohol is preferably ethylene glycol or 1,4-butanediol and aliphatic polybasic acid is preferably adipic acid or succinic acid in the combination of polyhydric alcohol and polybasic acid.

Aliphatic polyesters which can be used in the invention are derived from the above aliphatic polyhydric alcohol and aliphatic polybasic acid or reactive derivatives thereof and include, for example, polyethylene adipate, polybutylene adipate, polyethylene succinate and polybutylene succinate.

The amount of aliphatic polyesters in the copolymer of the invention is preferably in the range of 3.0 to 51% by weight, more preferably in the range of 5.0 to 40% by weight. The copolymer having particularly excellent flexibility and transparency can be obtained in such range. When the amount is less than 3.0% by weight, softness, ductility, plasticity and flexibility are liable to be insufficient. On the other hand, an amount exceeding 51% by weight tends to lower transparency.

No particular restriction is imposed upon the molecular weight of aliphatic polyester used in the invention. Consequently, a so-called oligomer having a polymerization degree of 100 or less can also be used.

Polysaccharides which can be used in the invention include carbohydrates obtained by dehydration polycondensation through glucoside bonds of two or more moles of monosaccharides and derivatives thereof. Polysaccharides which can be used in the invention also include polysaccharides having α-1,4-glucoside bonds alone, polysaccharides having β-1,4-glucoside bonds alone, polysaccharides having both α-1,4-glucoside bonds and β-1,4-glucoside bonds, and a mixture of polysaccharides having α-1,4-glucoside bonds alone and polysaccharides having β-1,4-glucoside bonds alone.

Polysaccharides which can be used in the invention practically include, for example, cellulose, cellulose nitrate, acetyl cellulose, methyl cellulose, ethyl cellulose, CMC, nitro cellulose, regenerated cellulose such as cellophane, viscose rayon, cupra; hemicellulose, starch, amylopectin, dextrin, dextran, glycogen, pectin, chitin, chitosan, and derivatives thereof. These polysaccharides can be used singly or as a mixture.

Polysaccharides can be prepared by an extraction process from natural products, synthetic process or semi-synthetic process. Any organisms and microorganisms in nature can be used as the source of supply for these polysaccharides.

In order to prepare the copolymer having strength for practical use within a short time, the molecular weight of polysaccharide is preferably 3,000 or more, more preferably 10,000 or more, most preferably 100,000 or more.

The polycondensation reaction of the invention can progress without solvent. For example, aliphatic polyhydric alcohol, aliphatic polybasic acid and polysaccharide can efficiently react in a homogeneous system. Additionally, in the case of using lactic acid as hydroxycarboxylic acid and cellulose or cellulose ester as polysaccharide, cellulose or cellulose ester can dissolve with ease in lactic acid and thus the reaction can efficiently progress even in the absence of solvent.

On reacting the polymer with polysaccharide in the invention, preferred polysaccharide has good compatibility with the polymer. When polysaccharide having low compatibility with the polymer is used, the reaction is liable to be inhomogeneous in the dehydration polycondensation and sometimes a gel-like and solvent-insoluble portion generates in the polymer. In view of such problem, polysaccharides which can be preferably used in the invention are acetyl cellulose, propionyl cellulose and other cellulose esters or methyl cellulose, ethyl cellulose and other cellulose ethers.

When a solvent is used in the invention, polysaccharides which are soluble in the solvent are preferably used and cellulose ester or cellulose ether having a high substitution degree is preferred.

The substitution degree of cellulose ester or cellulose ether is preferably 0.3 to 3.0, more preferably 1.0 to 2.8 in view of solubility in the solvent and properties of the copolymer to be obtained.

When the substitution degree is lower than the above range nonhomogeneous reaction is liable to occur in the polycondensation and a gel-like, insoluble portion tends to generate in the formed copolymer.

The amount of polysaccharide for use is in the range of preferably 0.1 to 10% by weight, more preferably 0.5 to 5% by weight for the amount of the copolymer obtained. The copolymer having high melt tension and extremely excellent transparence can be obtained in the range. When the amount is smaller than the range, melt tension is liable to be insufficient. On the other hand, when the amount is greater than the range, the high molecular weight copolymer becomes difficult to obtain.

No particular restriction is put upon the organic solvent used in the invention so long as the solvent can substantially maintain the progress of the reaction.

The organic solvents which can be used in the invention include, for example, toluene, xylene, mesitylene and other hydrocarbon solvents; chlorobenzene, bromobenzene, iodobenzene, dichlorobenzene, 1,1,2,2-tetrachloroethane, p-chlorotoluene and other halogenated hydrocarbon solvents; 3-hexanone, acetophenone, benzophenone and other ketone solvents; dibutyl ether, anisole, phenetole, o-dimethoxybenzene, p-dimethoxybenzene, 3-methoxytoluene, dibenzyl ether, benzyl phenyl ether, methoxynaphthalene and other ether solvents; phenyl sulfide, thioanisole and other thioether solvents; methyl benzoate, dimethyl phthalate, diethyl phthalate and other ester solvents; diphenyl ether and other diphenyl ether type solvents; 4-methylphenyl ether, 3-methylphenyl ether, 3-phenoxytoluene and other alkyl substituted diphenyl ether solvents; 4-bromophenyl ether, 4-chlorophenyl ether, 4-bromodiphenyl ether, 4-methyl-4'-bromodiphenyl ether and other halogen substituted diphenyl ether solvents; 4-methoxydiphenyl ether, 4-methoxydiphenyl ether, 4-methoxyphenyl ether, 3-methoxyphenyl ether, 4-methyl-4'-methoxydiphenyl ether and other alkoxy substituted diphenyl ether solvents; and dibenzofuran, xanthene and other cyclic diphenyl ether solvents. These solvents can be used singly or as a mixture.

The preparation process of the invention is a dehydration reaction. Thus, the organic solvent for use in the invention can be substantially dehydrated by some means. No restriction is imposed upon whether or not the solvent can make an azeotropic mixture with water and whether or not the solvent can separate from water. However, preferred organic solvents of the invention can separate from water with ease by separation, distillation or other separating means.

The organic solvent which can be used for the invention has a boiling point of preferably 100° C. or more, more preferably 135° C. or more. The dehydration reaction can efficiently progress without accompanying undesirable side reactions by carrying out the dehydration at low temperature under high vacuum.

In view of the above point, halogenated hydrocarbon solvents, ether type solvents, alkyl aryl ether type solvents and diphenyl ether type solvents are preferred and halogenated hydrocarbon solvents, alkyl aryl ether type solvents and diphenyl ether type solvents are more preferred, particularly in order to obtain a copolymer having a high weight average molecular weight.

No particular limitation is put upon the amount of the organic solvent used in the invention so long as the progress of the reaction can be substantially maintained. Generally, the amount of the solvent is preferably in the range which can provide a polymer concentration of 5 to 95%. However, from an industry standpoint, the amount is determined in view of reaction velocity, purity of the reaction product, volume efficiency and recovery of the solvent.

The reaction in the invention is a dehydration reaction and water generates with the progress of the reaction. The generated water accelerates hydrolysis of the copolymer which was formed by dehydration polycondensation and inhibits formation of high molecular weight copolymer. When the amount of water becomes too large in the reaction system, the reaction is interrupted.

When a monomer such as aliphatic polyhydric alcohol or aliphatic polybasic acid is used in the reaction, the remaining monomer interferes with the dehydration polycondensation reaction in a certain stage of the reaction. Consequently, water and/or monomer in the reaction system must be removed in order to increase reaction velocity and to obtain a copolymer having a higher molecular weight. The amount of water and/or monomer in the reaction system is preferably 500 ppm or less in the invention, and preferably 50 ppm or less in order to obtain a higher molecular weight copolymer.

A copolymer having a high weight average molecular weight of 40,000 to 50,000 can be obtained by using a diphenyl ether type solvent or o-dichlorobenzene even under a high water concentration and/or a high monomer concentration.

Further, in order to obtain a copolymer having a high weight average molecular weight, it is preferred to have a low concentration of water or monomer in the organic solvent of the reaction system. When azeotropically distilled organic solvent is subjected to a dehydration or monomer removal treatment by using a drying agent and/or adsorbent and thereafter returned to the reaction system, or new solvent having a low water content is charged to the reaction system, a copolymer having an weight average molecular weight of 50,000 to 1,000,000 can be obtained under the water and/or monomer concentration of 50 ppm or less in the organic solvent of the reaction system.

Use of solvent in the reaction is suitable for the above purpose, and water and/or monomer which are generated in the reaction are preferably removed together with the organic solvent from the reaction system.

At least a portion of the organic solvent is removed together with water and/or the monomer in order to remove water which was formed in the reaction and/or the monomer remaining after the reaction. An organic solvent containing a lower amount of water and/or monomer than those dissolved in the removed organic solvent is charged as an additional solvent to the reaction system while continuing the reaction.

The solvent which was portionally taken out of the reaction system can be subjected outside the system to treatment with drying agent or adsorbent or to dehydration and/or monomer removal by distillation and successively returned again to the reaction system in order to continue the reaction.

The embodiments concerning the dehydration and/or monomer removal treatment of the organic solvent in the reaction system of the invention also include a process for previously charging the solvent in excess and carrying out dehydration merely by discharging the organic solvent and a process for treating the organic solvent in the reaction system by using an other organic solvent.

No particular restriction is imposed upon the drying agents or adsorbents which can be used outside the reaction system for treating the organic solvent which was portionally taken out of the reaction system. The drying agents or adsorbents can be used so long as removing water and/or the monomer in the organic solvent of the reaction system is to such an extent that progress of the reaction can be maintained, so that a high molecular weight product having a sufficiently high polymerization degree can be formed, or that reversible decomposition of the product can be inhibited.

Drying agents or adsorbents which can be used in the invention include, for example, molecular sieve 3A, molecular sieve 5A, molecular sieve 13X and other molecular sieves; alumina, silica gel, calcium chloride, calcium sulfate, diphosphorus pentoxide, concentrated sulfuric acid, magnesium perchlorate, barium oxide, calcium oxide, potassium hydroxide, sodium hydroxide; calcium hydride, sodium hydride, lithium aluminum hydride and other metal hydrides; sodium and other alkali metals; and ion exchange resins. These drying agents or adsorbents can be used singly or as a mixture. In these agents, molecular sieves and ion exchange resins (cation exchange resins in particular) are preferred in view of handling and regeneration with ease.

Catalysts are preferably used in order to increase reaction velocity and obtain a high molecular weight copolymer in the invention.

Exemplary catalysts which can be used in the invention are, for example, metals, oxides thereof or salts thereof in the groups II, III, IV and V of the periodic table. The catalysts practically include zinc powder, tin powder, aluminum, magnesium and other metals; tin oxide, titanium oxide, germanium oxide and other metal oxide; stannous chloride, stannic chloride, stannous bromide, stannic bromide, antimony fluoride, zinc chloride, magnesium chloride, aluminum fluoride and other metal halides; tin sulfate, zinc sulfate, aluminum sulfate and other metal sulfates; magnesium carbonate, zinc carbonate and other metal carbonates; tin acetate, tin octoate, tin lactate, zinc acetate, aluminum acetate and other metal organic carboxylates; and tin trifluoromethanesulfonate, zinc trifluoromethanesulfonate, tin methanesulfonate, tin p-toluenesulfonate and other metal organic sulfonates. These catalysts can be used singly or as a mixture.

Other examples of the catalyst also include dibutyltin oxide and other organic metal oxides of the above metals; titanium isopropoxide and other metal alkoxides of the above metals; and diethyl zinc and other alkyl metals of the above metals. These catalysts can also be used singly or as a mixture.

No particular limitation is put upon the amount of the catalyst for use in the invention so long as the catalyst can substantially increase the reaction velocity. Generally, the amount of the catalyst used is preferably in the range of 0.0001 to 5% by weight, more preferably in the range of 0.001 to 1% by weight in view of economy for the amount of monomer and/or polymer used.

In the case of using the organic solvent for the reaction of the invention, no particular restriction is imposed upon the reaction temperature so long as the organic solvent can substantially maintain a liquid state in the reaction system and progress of the reaction can be maintained.

Boiling point reduction due to formation of azeotrope between the solvent and water leads to no problem so long as progress of the reaction can be substantially maintained at the prescribed temperature.

When the organic solvent is used for the reaction in the invention, the reaction temperature is in the range of generally 80° to 200° C., preferably 100° to 200° C., more preferably 110° to 180° C. in view of the generation velocity and heat decomposition velocity of the formed polymer.

The reaction is usually carried out under atmospheric pressure at the distillation temperature of the organic solvent. When a high boiling point organic solvent is used in order to maintain the reaction temperature in a preferred range, the reaction can also be carried out under reduced pressure.

The preparation of the copolymer in the invention is preferably carried out under vacuum or in an atmosphere of an inert gas such as nitrogen and argon while protecting the reaction system from contamination of outside moisture and removing moisture generated in the reaction system. The reaction can also be carried out while ventilating or bubbling the inert gas.

The reaction for preparing the copolymer of the invention can be carried out continuously or batchwise. Dehydration and charge of the solvent can also be conducted continuously or batchwise.

In the preparation process of the invention, the order for reacting aliphatic polybasic acid and aliphatic polyhydric alcohol with polysaccharide, and for reacting hydroxycarboxylic acid or polyhydroxycarboxylic acid and aliphatic polyester with acetyl cellulose or ethyl cellulose can be suitably selected depending upon the kind of monomer and polymer. Preferable embodiments of the reaction order are as follows.

1) Preferable embodiments for reacting aliphatic polybasic acid and aliphatic polyhydric alcohol with polysaccharide.

i) The first step: Formation of low molecular weight polyester

Aliphatic polybasic acid undergoes dehydration polycondensation reaction with an equivalent weight or more of aliphatic polyhydric alcohol without solvent in the presence of a catalyst at the temperature and pressure which do not cause evaporation of aliphatic polyhydric alcohol. Aliphatic polyester obtained by the reaction has an weight average molecular weight of 500 to 1,000 and can also have a molecular weight of about 5,000.

ii) The 2nd step: Formation of high molecular weight polyester

After finishing the 1st step, the reaction system is heated under reduced pressure, excess polyhydric alcohol is removed, successively the solvent is added and heated under reduced pressure. Water generated by the dehydration reaction and residual aliphatic polyhydric alcohol are removed together with the solvent to further increase the molecular weight of aliphatic polyester. The removed solvent separates water in a water separator and returns again to the reaction system. The solvent which returns to the reaction system preferably has a water content of 500 ppm or less. No particular limitation is imposed upon the amount of the organic solvent used so long as progress of the reaction can be substantially maintained. The amount of the organic solvent is, for example, preferably about 25% when converted to the concentration of polymer to be obtained. After reacting for several hours under these conditions, aliphatic polyester having an weight average molecular weight of 15,000 to 50,000 can be obtained depending upon kind of the solvent.

iii) Reaction of aliphatic polyester with polysaccharide

After finishing the 2nd step, polysaccharide is added to the reaction system, and heated under reduced pressure to carry out dehydration polycondensation reaction. The water separator which was used in the 2nd step is dismantled, a tube packed with a drying agent or adsorbent is mounted on the reaction vessel, distilled solvent passes through the drying agent or adsorbent layer, water concentration in the distilled solvent is reduced to 50 ppm or less, and the dehydrated solvent returns to the reaction system. The distilled solvent can also be treated in a separate reaction vessel which was previously charged with the drying agent or adsorbent and successively returned to the reaction system, or a new solvent having a low moisture content can also be charged to the reaction vessel. In the step, a very small amount of distilled polyhydric alcohol is also adsorbed on the drying agent or adsorbent and serves to increase the molecular weight of the copolymer obtained. After reacting for 10 to 60 hours under these conditions, a copolymer having an weight average molecular weight of 100,000 to 1,000,000 can be obtained.

2) Order for reacting hydroxycarboxylic acid or polyhydroxycarboxylic acid and aliphatic polyester with acetyl cellulose or ethyl cellulose The reaction of hydroxycarboxylic acid or polyhydroxycarboxylic acid and aliphatic polyester with polysaccharide can be carried out by any order. However, when polysaccharide is acetyl cellulose, it is preferred to react hydroxycarboxylic acid with acetyl cellulose in the presence of a catalyst and successively to add aliphatic polyester in view of solubility of acetyl cellulose and reactivity between aliphatic polyester and acetyl cellulose. Polyhydroxycarboxylic acid and aliphatic polyester have poor compatibility to acetyl cellulose. Consequently, in the case of adding acetyl cellulose to poly-hydroxycarboxylic acid or aliphatic polyester, the reaction proceeds in an insufficiently dissolved state, gel-like insoluble matter is liable to be generated, and the reaction mixture becomes highly viscous in some cases.

When polysaccharide is ethyl cellulose, ethyl cellulose has high solubility in other polymers or solvents and thus can be reacted in various orders. For example, in the presence of a catalyst, polyhydroxycarboxylic acid reacts with ethyl cellulose and successively aliphatic polyester undergoes the reaction or polyhydroxycarboxylic acid reacts with aliphatic polyester and successively ethyl cellulose undergoes the reaction. By these reaction orders, a uniform reaction product can be obtained without generation of gel or insoluble matter. The same result can be obtained in the presence of a catalyst by dissolving polyhydroxycarboxylic acid, aliphatic polyester and ethyl cellulose in the organic solvent at the same time.

Further, similar to the case of acetyl cellulose, a process for reacting the hydroxycarboxylic acid monomer with ethyl cellulose and successively with aliphatic polyester can also be carried out.

Preferred embodiments concerning various reactions of each monomer or each polymer of with polysaccharide will be illustrated below.

1) Reaction of lactic acid with acetyl cellulose

The process for reacting lactic acid with acetyl cellulose in an organic solvent in the presence of a catalyst will be illustrated in detail.

The copolymer of the invention can be obtained by reacting lactic acid with acetyl cellulose in an organic solvent in the presence of a catalyst. In order to further increase molecular weight of the polymer, at least a portion of the organic solvent is removed in the course of the reaction, and an organic solvent having a moisture content less than the moisture content of the removed organic solvent can be charged as an additional solvent to the reaction system while continuing the reaction.

The raw material acetyl cellulose preferably has an weight average molecular weight of 3,000 or more and a substitution degree of 0.3 to 3.0. Even when the substitution degree is 3.0, the ester exchange reaction takes place with ease and dehydration polycondensation of lactic acid progresses.

The amount of acetyl cellulose in the copolymer of the invention is preferably in the range of 0.1 to 10% by weight, more preferably in the range of 0.5 to 5% by weight. The copolymer having high melt tension and excellent transparency can be obtained in this range. When the amount is less than 0.1% by weight, melt tension is liable to become insufficient. On the other hand, an amount more than 10% by weight tends to cause heterogeneous reaction.

The amount of the catalyst used is preferably in the range of 0.001 to 5% by weight in most cases, more preferably in the range of 0.001 to 1% by weight in view of economy for the total amount of lactic acid and acetyl cellulose.

Practical reaction procedures are as described below.

The prescribed amount of the solvent, L-lactic acid, acetyl cellulose and catalyst is individually charged to the reaction vessel, and successively the reaction vessel is heated to carry out oligomerization while distilling off water from the reaction system. Thereafter a tube packed with molecular sieve or other drying agents and the solvent is mounted on the reaction vessel so as to return the distilled solvent to the reaction vessel after passing through the tube. The distilled solvent can also be treated in a separate reaction vessel charged with the drying agent and returned to the reaction system, or a new solvent having a low moisture content can also be charged to the reaction vessel.

The reaction is continued for a few dozens of hours while maintaining the moisture content of the solvent at 50 ppm or less by these procedures. The copolymer thus obtained from L-lactic acid and acetyl cellulose has an weight average molecular weight of 50,000 to 1,000,000.

The copolymer obtained has various grades of weight average molecular weight depending upon the reaction conditions such as kind of the solvent, kind and amount of the catalyst, reaction temperature, reaction time, and treating procedure of azeotropically distilled solvent. The weight average molecular weight is preferably in the range of 50,000 to 1,000,000. When the weight average molecular weight of the copolymer is less than 50,000, the film obtained by processing the copolymer has lower tensile strength and elongation.

The copolymer is transparent and has high melt tension. The film, filament and other processed articles which are obtained by using the copolymer have excellent strength and toughness.

Further, the copolymer thus obtained has a melt tension more than 10 times that of polylactic acid and thus can be processed with ease into foams and blow molded items.

2) Reaction of lactic acid with ethyl cellulose

The copolymer obtained by reacting lactic acid with ethyl cellulose in the organic solvent in the presence of a catalyst will be illustrated in detail below.

The copolymer of the invention can be obtained by reacting lactic acid and ethyl cellulose in an organic solvent in the presence of a catalyst. As to the order of the reaction, it is preferred to previously polymerize lactic acid in the presence of a catalyst to obtain polylactic acid having an weight average molecular weight of 3,000 or more and successively to charge ethyl cellulose. When the polymerization degree of lactic acid is lower than the above range, addition of ethyl cellulose tends to color the resulting copolymer. In order to further increase molecular weight of the polymer in the course of the reaction, at least a portion of the organic solvent is removed and an organic solvent having a moisture content less than that of the removed organic solvent is charged as an additional solvent to the reaction system while continuing the reaction.

The raw material ethyl cellulose preferably has an weight average molecular weight of 3,000 or more, and a substitution degree of 0.3 to 2.8 for three hydroxyl groups which are present on a $C_6$ unit of cellulose.

When the substitution degree is lower than the above range, nonhomogeneous reaction is liable to occur and the formed polymer tends to include an insoluble ingredient. On the other hand, a substitution degree higher than the above range leads to decreased numbers of reactive hydroxyl groups, causes reduction of active portions for the reaction and thus results in difficult initiation of the reaction.

The copolymer of the invention has an ethyl cellulose unit of preferably in the range of 0.1 to 10% by weight, more preferably in the range of 0.5 to 5% by weight. The copolymer having a high melt tension and particularly excellent transparency can be obtained in the above range of the ethyl cellulose unit. The ethyl cellulose unit of lower than 0.1% by weight is liable to make melt tension insufficient. On the other hand, an ethyl cellulose unit higher than 10% by weight tends to cause the copolymer to become brittle.

The amount of the catalyst is preferably in the range of 0.0001 to 5% by weight in most cases, more preferably in the range of 0.001 to 1% by weight in view of economy for the total amount of lactic acid and ethyl cellulose.

Practical reaction procedures are as follows.

A prescribed amount of the solvent, L-lactic acid and catalyst is respectively charged to a reaction vessel and oligomerization is carried out by heating the reaction vessel while distilling off water from the reaction system. Ethyl cellulose is added after the molecular weight of the oligomer exceeds 3,000, a tube packed with a drying agent and solvent is mounted on the reaction vessel so as to return the distilled solvent to the reaction vessel after passing through the tube, or the distilled solvent is treated in a separate vessel charged with a drying agent and is successively returned to the reaction vessel, or a new solvent having a low moisture content is charged to the reaction vessel.

A copolymer of L-lactic acid and ethyl cellulose having an weight average molecular weight of 50,000 to 1,000,000 can be obtained by continuing the reaction for a few dozens of hours while maintaining the solvent at a moisture content of 50 ppm or less by these procedures.

The copolymer obtained has various weight average molecular weights depending upon the reaction conditions such as kind of the solvent, kind and amount of the catalyst, reaction temperature, reaction time and treating procedures of azeotropically distilled solvent. The weight average molecular weight is preferably in the range of 50,000 to 1,000,000. The copolymer having an weight average molecular weight of less than 50,000 leads to lower strength of films and filaments which are obtained by processing the copolymer.

The copolymer is transparent and has high melt tension. The film, filament and other processed articles which are obtained by using the copolymer have excellent strength and toughness. Particularly, the degradable copolymer thus obtained has a melt tension more than 10 times that of polylactic acid and thus can be processed with ease into foams and blow molded items.

3) Reaction of 1,4-butanediol with succinic acid and acetyl cellulose

To a reaction vessel equipped with a water separator, for example, a Dean Stark trap, a solvent and a prescribed amount of 1,4-butanediol, succinic acid, acetyl cellulose, and catalyst are charged. The reaction vessel is heated and the solvent and water is azeotropically distilled into the water separator. Water which exceeds the solubility of the solvent is separated in the water separator and removed to the outside of the reaction system and the water saturated solvent is returned to the reaction system.

1,4-Butanediol, succinic acid and acetyl cellulose are oligomerized in the step. The product in the step has an weight average molecular weight of usually 500 to 1,000. The molecular weight can also be increased to about 5,000. The reaction time for the oligomerization is from 0.5 to several hours.

The oligomerization reaction can also be carried out previously in a separate reaction vessel, without solvent, without catalyst, under reduced pressure or can also be carried out in a solvent without catalyst.

The reaction can be continued as intact at the distillation temperature of the solvent while removing water which was generated with the progress of the reaction and returning the water saturated solvent to the reaction system. Water content of the solvent in the case is preferably 500 ppm or less.

After reacting for several more hours, a copolymer having an weight average molecular weight of 15,000 to 50,000 can be obtained depending upon the kind of the solvent.

In order to obtain a copolymer having a still higher molecular weight, following procedure i), ii) or iii) can be carried out.

i) Water in the reaction system is almost completely removed by the water separator. Successively, the water separator is dismantled, the distilled solvent is returned to the reaction system after passing through a tube packed with a drying agent or absorbent, and dehydration is continued.

ii) Water in the reaction system is almost completely removed by the water separator. Successively, the water separator is dismantled, the distilled solvent is returned to the reaction system after treating in a separate reaction vessel charged with a drying agent or absorbent, and dehydration is continued.

iii) Water in the reaction system is almost completely removed by the water separator. Successively, the water separator is dismantled, a new solvent having a low moisture content is charged to the reaction vessel, and dehydration is continued.

Water content of the solvent is reduced to 50 ppm or less by these procedures and the reaction is continued as intact for a few dozens of hours. The copolymer having an weight average molecular weight of 50,000 to 1,000,000 can be obtained, depending upon the kind of the solvent.

The copolymer thus obtained has high melt tension and excellent flexibility.

4) Reaction of lactic acid with polybutylene succinate and acetyl cellulose or ethyl cellulose Lactic acid is previously subjected to dehydration polycondensation in the presence of a catalyst to form a weight average molecular weight of 3,000 or more, successively acetyl cellulose or ethyl cellulose is added and reacted, thereafter polybutylene succinate is added, and the dehydration polycondensation reaction is further continued by heating. In order to further increase molecular weight of the copolymer in the course of the reaction, at least a portion of the organic solvent is removed and an organic solvent having a moisture content less than that of the removed organic solvent is charged as an additional solvent to the reaction system while carrying out the reaction. For carrying out such a procedure, the distilled solvent can be dehydrated by returning to the reaction system after passing through a tube packed with a drying agent.

Acetyl cellulose and ethyl cellulose raw materials preferably have an weight average molecular weight of 3,000 or more.

The amount of acetyl cellulose units and ethyl cellulose units in the copolymer of the invention is preferably in the range of 0.1 to 10% by weight, more preferably in the range of 0.5 to 5% by weight. The copolymer having particularly excellent transparency and melt tension can be obtained in such range of units. When the amount is less than 0.1% by weight, melt tension tends to become insufficient. On the other hand, a amount exceeding 10% by weight is liable to cause an heterogeneous reaction or causes the copolymer to become brittle.

The raw material polybutylene succinate preferably has an weight average molecular weight of 10,000 or more.

The amount of polybutylene succinate in the copolymer of the invention is preferably in the range of 3.0 to 51% by weight, more preferably is the range of 5.0 to 40% by weight. The copolymer having particularly excellent flexibility and transparency can be obtained in such range. When the amount is less than 3.0% by weight, softness, ductility, plasticity and flexibility are liable to be insufficient. On the other hand, the amount exceeding 51% by weight tends to lower transparency.

The amount of the catalyst is preferably in the range of 0.0001 to 5% by weight in most cases, more preferably 0.001 to 1% by weight in view of economy for the total amount of lactic acid and acetyl cellulose or ethyl cellulose.

Practical reaction procedures are as follows.

A prescribed amount of the solvent, L-lactic acid and catalyst are individually charged to a reaction vessel, the reaction vessel is heated, and oligomerization is carried out while distilling off water from the reaction system. Successively, acetyl cellulose or ethyl cellulose and polybutylene succinate is added, a tube packed with a drying agent such as molecular sieve and solvent is mounted on the reaction vessel so as to return the distilled solvent to the reaction vessel after passing through the tube or the distilled solvent is treated in a separate reaction vessel charged with a drying agent and returned to the reaction vessel or a new solvent having a low water content is charged to the reaction vessel.

The reaction is carried out for a few dozens of hours while maintaining the water content of the solvent at 50 ppm or less by these procedures. The copolymer of L-lactic acid with acetyl cellulose or ethyl cellulose and polybutylene succinate thus obtained has an weight average molecular weight of 50,000 to 1,000,000.

The copolymer obtained has primarily the structure of a polymer which has repeating structural units of the formula (1):

is linked by an ester bond to one or more hydroxyl groups of acetyl cellulose or ethyl cellulose, and further, another polymer which has repeating structural units of the formula (2):

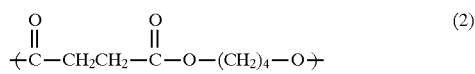

is linked by an ester bond to the end hydroxyl groups of said polymer.

The copolymer having various grades of the weight average molecular weight can be obtained depending upon the reaction conditions including kind of the solvent, kind and amount of the catalyst, reaction temperature, reaction time and treating procedure of the azeotropically distilled solvent. The weight average molecular weight is preferably in the range of 50,000 to 1,000,000.

As described above, the amounts of the repeating structural units of the formula (1) and the formula (2) are 39 to 96.9% by weight, preferably 55 to 94.5% by weight and 3.0 to 51% by weight, preferably 5.0 to 40% by weight, respectively.

The copolymer exhibits excellent strength, toughness, transparency and flexibility when processed into films, filaments and formed items. Further, the copolymer has a melt tension more than 0.7 g at the condition that melt flow rate is 10 g/10 min. and thus can be processed with ease into foams and blow molded items.

The copolymer prepared by the process of the invention can be isolated from the reaction mixture by any known and commonly used process. No particular restriction is imposed upon the isolating process so long as the reaction product can be substantially isolated with the desired purity.

The isolating process of the copolymer from the reaction mixture includes, for example, a poor solvent such as isopropyl alcohol is added in excess to a solution containing the reaction product after finishing the reaction at a suitable temperature, precipitated crystals of the reaction product are isolated by decantation or filtration, the crystals are thoroughly washed with a lean solvent which is difficult to dissolve said crystals, and the crystals are dried.

When the condensation reaction is carried out in the presence of the catalyst in the process of the invention, the copolymer obtained contains residual catalyst. The residual catalyst in the resulting copolymer tends to have an adverse effect on the heat resistance and weatherability of the copolymer. Thus, the catalyst remaining in the resulting copolymer is preferably removed.

Preferred embodiments for the process of removing the catalyst include, for example, a powdery solid copolymer obtained by cooling the polycondensation reaction mixture is brought into contact with an acidic substance with or without stirring in the presence of a hydrophilic organic solvent.

Exemplary hydrophilic organic solvents which can be used for the process include methanol, ethanol, isopropanol, butanol and other alcohols; acetone, methyl ethyl ketone and other ketones; tetrahydrofuran, dioxane and methyl tert.-butyl ether and other ethers; acetic acid, butyric acid and other carboxylic acids; acetonitrile and other nitrites; and N,N-dimethylformamide, N,N-dimethylacetamide, 1,3-dimethylimidazolidinone, hexamethylphosphoramide and other amides. These hydrophilic organic solvents can be used singly or as a mixture. In these solvents, alcohols which are cheap and difficult to dissolve the copolymer are preferably used in most cases.

Representative acidic substances which can be used include, for example, hydrochloric acid, sulfuric acid, nitric acid, phosphoric acid and other inorganic acids; and acetic acid, p-toluenesulfonic acid and other organic acids. These acidic substances can be used singly or as a mixture. In these acidic substances, hydrochloric acid, sulfuric acid and nitric acid are preferably used in view of a low price in most cases.

The amount of the acidic substance is preferably 0.0001 to 5.0 moles in most cases, more preferably 0.001 to 1 mole for 100 parts by weight of the copolymer. When the amount is less than 0.0001 mole, the removing effect on the catalyst is reduced. On the other hand, an amount more than 5.0 moles leads to deterioration of the copolymer.

No particular restriction is put upon the form of the solid copolymer to be used for the catalyst removal treatment.

Representative forms of the solid copolymer which can be used for the catalyst removal treatment include, for example, powder, granule, pellet, flake, block and lyophilize.

No particular limitation is imposed upon the bulk density of the copolymer used for the catalyst removal treatment. The bulk density of the copolymer is generally 0.5 g/ml or less, preferably 0.05 to 0.5 g/ml. The bulk density higher than 0.6 g/ml reduces contact efficiency with the acidic substance and accordingly tends to decrease catalyst removal efficiency. On the other hand, a bulk density lower than 0.05 g/ml results in quite no problem. However, filterability is decreased after the treatment and thus the removal efficiency of the treating agent such as the acidic substances is decreased.

In the catalyst removal treatment of the copolymer with the acidic substance, the weight ratio of the hydrophilic organic solvent to the copolymer is, in most cases, preferably 3 to 40% by weight of the copolymer for the total weight of the hydrophilic organic solvent and the copolymer.

The temperature for carrying out the catalyst removal treatment of the copolymer with the acidic substance is preferably 0° to 100° C. in most cases, more preferably 0° to 60° C.

The time required for the catalyst removal treatment of the copolymer with the acidic substance is preferably 0.1 to 24 hours in most cases, more preferably 0.5 to 8 hours.

The weight average molecular weight and molecular weight distribution of the copolymer obtained by the process of the invention can be controlled in a desired manner by suitably selecting the reaction conditions which include presence or absence of the solvent, kind of the solvent, presence or absence of the catalyst, kind and amount of the catalyst, reaction temperature, reaction time, treatment process of azeotropically distilled solvent, and extent of solvent dehydration in the reaction system.

The copolymer having a weight average molecular weight of 50,000 or more can be obtained by the invention and exhibits excellent processability when the copolymer is processed into below described films, bottles, foams and other formed items.

The copolymer obtained by the process of the invention has higher melt tension as compared with common polyhydroxycarboxylic acid. The copolymer has high tension in the molten state. Consequently, for example, common problems such as sagging of a molten film and reduction of film width due to neck-in are decreased in the preparation of a film by T-die extrusion, and film formation can be carried out with ease. The copolymer has an advantage that a foam of high expansion ratio can be obtained with ease as compared with foams of common polyhydroxycarboxylic acid. Further, the copolymer has characteristics that direct blowing becomes easy to carry out in blow molding operation and that vacuum forming of sheet materials can be carried out with ease because sagging of a hot sheet is reduced.

The copolymer which is flexible and transparent and has a still higher melt tension can be obtained in the process of the invention by reacting hydroxycarboxylic acid or polyhydroxycarboxylic acid with polysaccharide and successively reacting with aliphatic polyester derived from aliphatic polybasic acid and aliphatic polyhydric alcohol.

When cellulose ester, ethyl cellulose in particular, is used as polysaccharide in the invention, the copolymer having an extremely low crystallization velocity can be obtained even in the ease of essentially crystalline polyhydroxycarboxylic acid such as poly-L-lactic acid. Such copolymer can improve the defect which causes loss of transparency by crystallization of the formed items under conditions of high temperature and high humidity in uses where the items are employed in an amorphous state like a molded article which attaches importance to transparency.

Furthermore, the copolymer can also solve the problem that in preparation of a biaxially oriented film, stretching in one direction lowers crystallization temperature of the film and makes stretching in another direction difficult.

The copolymer obtained by the invention is a material suited for injection molding, extrusion, calendaring, blow forming, balloon forming, vacuum forming and foaming. Particularly, the copolymer obtained by the invention has a high melt tension and thus the molten copolymer is difficult to sag and flow and can be processed with ease into foams and blow bottles.

Especially, the degradable copolymer of the invention is suited for blow forming, foaming, extrusion and other processing which requires strength of the molten polymer. For example, the copolymer exhibits high melt tension in the preparation of sheet by extrusion and has characteristics that sagging of a molten sheet or a decrease in sheet width due to neck-in is reduced.

The uses of the copolymer obtained by the invention will be illustrated in detail hereinafter.

The copolymer obtained by the invention can be favorably applied by way of suitable processing to various uses, for example, members of writing utensils such as ball-point pens, pencils and sharpens, stationary elements, golf tees, members of a smoke golf ball for an opening ceremony, capsules of oral medicine, suppository carrier for the anus and vagina, plaster carrier for skin and mucous membrane, capsules of agricultural chemicals, fertilizer capsules, capsules of seeds and plants, compost bags, fishline bobbins, fishing buoys, fishery false worms, lures, fishery buoys, hunting decoys, hunting shot capsules, camping outfits such as tableware, nails, piles, binding materials, antislipping materials for a muddy or snowy road and blocks.

The copolymer obtained by the invention can be favorably used by way of suitable processing for various applications, for example, lunch boxes, dinner sets, containers of lunches and daily dishes which are marketed in a convenience store, chopsticks, half-split chopsticks, forks, spoons, skewers, toothpicks, cup for Chinese noodles, cups for use in an automatic vending machine of drinks, containers and trays for foodstuffs including fresh fish, fresh meat, vegetables and fruits, bean curd, and common dishes; boxes for use in a fresh-fish market; bottles and cans for dairy products including milk, yogurt, and lactic acid beverages; bottles and cans for softdrinks including carbonated water and cooling beverages; bottles and cans for alcoholic drinks including beer and whisky; pump-fitted or pumpless bottles for shampoo and liquid soap; tubes for tooth paste; cosmetic containers, detergent containers, bleaching agent containers, cold reserving boxes, flower pots, casings of an water purifying cartridge, casings of an artificial kidney and artificial liver, members of an injector; cushioning materials for use in transportation of household electrical appliances including a television set and a stereo; cushioning materials for use in transport of precision machinery including a computer, printer and clock; cushioning materials for use in transportation of optical instruments including cameras, glasses, microscopes and telescopes; and cushioning materials for use in transport of ceramic products including glass and pottery.

The copolymer obtained by the invention is a suitable material for preparation of film and sheets.

The films and sheets comprising the copolymer obtained by the invention can be prepared by known and commonly used techniques such as extrusion, coextrusion, calendaring, hot pressing, solvent casting, inflation, balloon technique and tenter stretching.

In the case of processing the copolymer of the invention into films and sheets, known and generally used dies can also be employed in the extrusion. Exemplary dies include a T-die, inflation die (circular die), flat die, feed block/single manifold die and single manifold die obtained by combination of several feed blocks.

And multilayer films can be prepared by coextrusion of two or more copolymers having different properties and/or other polymers.

Employment of the inflation or balloon method enables to carry out simultaneous biaxial stretching and thus can prepare durable products having a low elongation, high elastic modulus and high toughness in high productivity with a relatively low cost. Additionally, the products are in the form of a seamless cylinder and hence can be favorably used for the production of bags and pouches such as a compost bag, a carrying bag used in a super-market and a pouch used for protection of the surroundings from wetting by condensed water on a pack of low temperature foodstuffs such as frozen foods and fresh meat.

Combination of the co-extrusion method enable preparation of multilayer films with high productivity by using two or more of the copolymers of the invention having different properties and/or other kinds of polymer.

The inflation method or balloon method can also be combined with the co-extrusion method.

The films or sheets comprising the copolymer of the invention are also suited for stretching, blowing, vacuum, forming and other fabrications which provide a two dimensional or three-dimensional form.

The films or sheets comprising the copolymer of the invention can be favorably used for shopping bags, garbage bags, compost bags, cement sacks, fertilizer bags, food and cake packaging films, foodstuff wrapping films, agricultural and horticultural films, green house films, films for packaging video, audio and other magnetic tape cassette products, floppy disk packaging film, fences, oil fences for ocean, river and lake, pressure-sensitive adhesive tapes, tape, tying materials, waterproof sheets, umbrellas, tents and bags for a sandbag, cement and fertilizer.

A breathable and porous film can be obtained by extruding a polymer comprising calcium carbonate, barium sulfate, titanium oxide and other inorganic materials and stretching the resulting film. Such film can be used for diaper holders and specific packaging materials.

A seamless pipe comprising the copolymer obtained by the invention can be prepared by extruding through a circular die. Combination with the co-extrusion method also enables the preparation of a multilayer seamless pipe by using two more degradable copolymers of the invention and/or other kinds of polymer.

Square bars and columns comprising the copolymer of the invention can be obtained by extrusion through a die. Combination with the coextrusion method enables the preparation of square bars and columns having a section of multilayer structure by using two or more copolymers of the invention and/or other kinds of polymer. Square bars and columns having a specific sectional structure or sectional pattern like the annual ring of a tree can also be prepared by combination with the coextrusion method.

On preparing films and sheets from the copolymer obtained by the invention, suitable selection depending upon the object on the extrusion conditions, stretching conditions and additives including antioxidants, heat stabilizers, ultraviolet absorbers, lubricants, fillers, anti-adhesion agents, anti-static agents, surface wetting improvers, co-incineration agents, anti-slip agents and colorants, enables the preparation of films and sheets comprising the degradable copolymer of the invention and having characteristics which include desired physical properties, gas barrier properties, optical properties, wave length spectrum of transmitted light, light screening properties and oil resistance.

In the case of processing the copolymer obtained in the invention into films and sheets, fabrication which can be carried out in the post treatment steps or finishing steps include welding, heat sealing of machine-seamed holes, primer application, pressure-sensitive adhesive application, agent application, parkarizing, vapour deposition, spattering, CVD, coating, etching, spraying, dyeing, painting, electrostatic painting, air brushing, laminating, sandwiching, embossing, provision of stereoscopic pattern, textured finishing, crimping, printing, transfer, sanding, shearing, punching, blanking, honeycomb formation, formation of corrugated board structure and formation of laminated structure.

Known and commonly used methods which can be employed depending upon the object in the post treatment steps or finishing steps include calendaring, extrusion, screen printing, gravure printing, letter press printing, intaglio printing, doctor blade coating, dip coating, spray coating, air brush coating and electrostatic coating.

The films or sheets comprising the copolymer of the invention can also be converted to a laminated product of multilayer structure by laminating with or adhering to a sheet of different material such as paper or other materials.

As described above, the copolymer obtained in the invention has high melt tension and is thus effective for preparation of foam. The foam in the invention includes a resin structure which contains many hollow portions such as a gas bubble, void or cavity in the interior of the resin, has a low apparent density, disperses continuous and/or closed hollow phases in the continuous phase of the resin and has a two phase structure or multi-phase structure. The foam also includes common materials which are recognized to be, for example, a high polymer having cellular structure, blown high polymers, expanded high polymer, foamed high polymer and high polymer foam, and further includes both flexible and rigid materials.

The foam comprising the copolymer obtained in the invention can be prepared by processes such as, for example, gas injection foaming and bead foaming, which are known and in public use. Characteristics of hollow portions including the bubble, void and cavity in the foam, for example, open cell content, closed cell content, cell size, cell shape, distribution of the cell, and uniformity of cell size can be controlled by setting suitable foaming conditions.

Blowing agents which can be used for preparing foam include inert gas, chemical blowing agents which generate inert gas by decomposition, hydrocarbons or chlorinated hydrocarbons having 3 to 5 carbon atoms, fluorocarbons, water, nitrogen, LPG, LNG, organic liquid having a low boiling point, carbon dioxide gas and ammonia.

Chemical blowing agents include, for example, sodium hydrogen carbonate, dinitrosopentamethyllenetetramine, sulfonyl hydrazide, azodicarbonamide, p-toluenesulfonyl semicarbazide, 5-phenyltetrazole, diisopropylhydrazodicarboxylase, 5-phenyl-3,6-dihydro-1,3,4-oxadiazine-2-one, and sodium boron hydroxide.

Physical blowing agents include, for example, n-pentane, 2,2-dimethylpropane, 1-pentene and other pentanes; n-hexane, 2-methylpentane, 3-methylpentane, 2,2-dimethylbutane, cyclohexane and other hexanes; n-heptane, 2,2-dimethylpentane, 2,4-dimethylpentane, 3-ethylpentane, 1-heptene and other heptanes; toluene, trichloromethane, tetrachloromethane, trichlorofluoromethane, methanol, 2-propanol, isopropyl ether and methyl ethyl ketone.

Exemplary fluorocarbons include CFC-11, CFC-12, CFC-113, CFC-114 and other freons of CFC-series.

Representative chlorofluorocarbon (CFC) substitutes include HCFC-141a, HCFC-142b, HFC-134a, HCFC-141b, HCFC-22, CFC-1113, HFC-32, HFC-125, HCFC-124, HFC-125, HFC-125a, HCFC-123, and HFC-4310.

Foams comprising the copolymer obtained in the invention can also be favorably used for, for example, lunch boxes, dinner sets, containers of lunches and daily dishes which are marketed in a convenience store, cups for Chinese noodles, cups for use in an automatic vending machine for drinks, containers and trays for foodstuffs including fresh fish, fresh meat, vegetables and fruits, bean curd, and common dishes; boxes for use in a fresh-fish market; containers for dairy products including milk, yogurt, and lactic acid beverages; containers for carbonated water and cooling beverages; containers for alcoholic drinks including beer and whisky; cosmetic containers, detergent containers, bleaching agent containers, cold reserving boxes, flower pots, tapes, cushioning materials for use in transportation of household electrical appliances including a television set and a stereo; cushioning materials for use in transport of precision machinery including a computer, printer and clock; cushioning materials for use in transportation of optical instruments including cameras, glasses, microscopes and telescopes; cushioning materials for use in transport of ceramic products including glass and pottery; light screening materials, heat insulation materials and soundproof materials.

Foams comprising the copolymer obtained in the invention can be preferably applied to medical and sanitary uses, for example, bandages, plaster carrier for skin and mucous membrane, triangular bandages, adhesive tapes, towels, disposable towels, disposable wet towels, wet hand towels, dustclothes, tissue, wet tissue for cleaning and disinfection, disposable diapers, menses and discharges napkins, tampons for menses, blood absorbing tampons for surgery and birth, sanitary cover-stock materials, and sterilized bags.

These medical and sanitary products can be germ-free packed after sterilization, bactericidal treatment or disinfection by known and commonly used methods which include heat or steam sterilization, ethylene oxide gas sterilization, sterilization with aqueous hydrogen peroxide solution or ozone, sterilization by radiation of ultraviolet rays or electromagnetic waves, sterilization by emitting radiation such as gamma rays, and sterilization with bactericides such as ethanol and benzalconium chloride. These products can also be prepared and packed under germ-free or endotoxin-free conditions by installing production steps in a clean bench or clean room which can feed laminar flow of ultraclean air through a HEPA filter.

Foams comprising the copolymer obtained in the invention can be favorably applied to general uses in industry including agriculture, fishery, forestry, manufacturing industry, building and civil industry, and traffic and transport; and to recreational uses including leisure and sport. These uses include, for example, agricultural victoria lawn, oil absorbing materials, weak ground reinforced materials, artificial leather, bags for sandbag, heat insulation material, soundproof materials, cushioning materials, cushioning materials of bed, chair and other furnitures, floor cushioning materials, packaging materials, binding materials, and anti-slipping materials for a muddy or snowy road.

EXAMPLE

Following methods were used for evaluating results of the examples.
(1) Weight average molecular weight:
  Weight average molecular weight (Mw) of polyhydroxy-carboxylic acid, aliphatic polyester, copolymer and ethyl cellulose was measured by gel permeation chromatography at a column temperature of 40° C. in a chloroform solvent by comparison with polystyrene reference standard.
  Weight average molecular weight (Mw) of acetyl cellulose was measured by gel permeation chromatography at a column temperature of 45° C. in a 0.01M-LiBr DMF solution by comparison with polystyrene reference standard.
(2) Moisture content in a solvent:
  Measured with a Karl Fischer's moisture meter, MKC-210 (manufactured by Kyoto Denshi Kogyo Co.).
(3) Differential thermal analysis:
  Measured with a scanning calorimeter, DSC-3100 (manufactured by Mac Science Co.) in the temperature range of −20° C. to 230° C.
(4) Tensile strength:
  Tensile strength of a film sample was measured in accordance with JIS K-6732.
(5) Transparency:
  Transparency of a film sample was evaluated by measuring Haze with a Haze meter, TC-HIII (manufactured by Tokyo Denshoku Co.), in accordance with JIS K-6714.
(6) Melt tension (MT-value):
  Measured at temperature of 190° C. under load of 2160 g in accordance with ASTM 1238.
(7) Heat resistance
  A film of 3cm×1cm suspended a load of 20 g and was heated at 120° C. for 10 minutes. Elongation after heating was measured.
  The film having a high heat resistance exhibited almost no elongation. The film having low heat resistance deformed by elongation in the course of heating.
(8) Flexural strength and flexural modulus
  Measured by carrying out a flexural test in accordance with JIS K-7113.
(9) Degradability
  A film was buried in a compost at room temperature for 30 days. Degradability was evaluated by measuring tensile strength of the film before and after the burying test.

Example 1

A mixture of 89.3 g of 90% L-lactic acid, 1.9 g of acetyl cellulose having a weight average molecular weight of 30,000 and substitution degree of 1.5, 300 g of diphenyl ether, and 0.37 g of tin powder was heated with stirring at 130° C. for 3 hours under reduced pressure of 50 mmHg and thereafter at 130° C. for 3 hours under reduced pressure of 30 mmHg while distilling water out of the reaction system in order to prepare an oligomer. A Dean Stark Trap was mounted on the reactor and an azeotropic dehydration reaction was carried out at 140° C. for 8 hours under reduced pressure of 24 mmHg while distilling out generated water. Successively, the Dean Stark trap was dismantled and a tube packed with 50 g of molecular sieve 3A and 73.0 g of diphenyl ether having a moisture content of 10 ppm or less was mounted so as to return the distilled solvent to the reaction system after passing through the molecular sieve layer. The reaction was further continued at 130° C. for 9 hours under reduced pressure by 13 mmHg by heating and stirring the mixture while preventing contamination by water into the reaction system.

The solvent after passing through the molecular sieve had a moisture content of 2 ppm. To the reaction mixture, 600 ml of a 0.7% hydrochloric acid/isopropyl alcohol solution was added, stirred for an hour and filtered with suction. Such filtration operation was carried out twice to remove tin powder.

The filter cake was stirred with 600 ml of isopropyl alcohol and suction-filtered. Such operation was repeated until the filtrate became neutral. Successively the cake was washed with hexane and dried at 60° C. with hot air to obtain 53.2 g (80.3% yield) of a copolymer.

The copolymer thus obtained had a weight average molecular weight of 725,000. As a result of differential thermal analysis, the copolymer had a glass transition temperature of 58.1° C. and melting point of 156.4° C.

The copolymer thus obtained was hot-pressed at temperature of 180° C. to prepare a pressed film. The film prepared had following properties:
  Thickness: 147~154 μm
  Tensile strength: 600 kg/cm² (yield)
  Elongation: 9%
  Transparency (Haze):<1%
  Melt-tension (MT-value): 13.5 (g)
    (MI-value): 6.6 (g/10 min.)

The film was deteriorated in the degradation test and the strength of the film could not be measured after the test.

Example 2

A mixture of 178.6 g of 90% L-lactic acid, 1.3 g of acetyl cellulose having an average molecular weight of 30,000 and substitution degree of 1.5, and 0.74 g of tin powder was heated with stirring at 130° C. for 3 hours under reduced pressure of 50 mmHg and successively at 130° C. for 3 hours under reduced pressure of 30 mmHg to carry out oligomerization while distilling water from the reaction system. Thereafter, o-dichlorobenzene, having a moisture content of 10 ppm or less was added, and a tube packed with 70 g of molecular sieve 3A and 96.5 g of o-dichlorobenzene having a moisture content of 10 ppm or less was mounted on the reactor so as to return the distilled solvent to the reaction system after passing through the molecular sieve layer. The reaction was further continued at 140° C. for 10 hours under reduced pressure of 250 mmHg by heating and stirring the mixture while protecting the reaction system from contamination by water.

The solvent after passing through the molecular sieve had a moisture content of 2 ppm. To the reaction mixture, 800 ml of a 0.7% hydrochloric acid/isopropyl alcohol solution was added, stirred for an hour and filtered with suction. Such filtration operation was carried out twice to remove tin powder. The filter cake was stirred with 600 ml of isopropyl alcohol and suction-filtered. Such operation was repeated until the filtrate became neutral. Successively the cake was washed with hexane and dried at 60° C. with hot air to obtain 100.4 g (77.3% yield) of a graft copolymer.

The copolymer thus obtained had a weight average molecular weight of 329,000, and also had a glass transition temperature of 57.5° C. and melting point of 159.1° C. by differential thermal analysis.

The copolymer was hot-pressed at 180° C. to prepare a film. The film had a thickness of 122–136 μm, tensile strength of 590 kg/cm² (yield point) and 470 kg/cm² (break point), elongation of 27%, transparency (Haze) of less than 1%, and melt tension of MT-value of 1.8(g) and MI-value of 39(g/min.). The film was greatly deteriorated in the degradation test and the strength of the film could not be measured after the test.

Example 3

A mixture of 89.3 g of 90% L-lactic acid, 300 g of diphenyl ether and 0.37 of tin powder was heated with stirring at 130° C. for 3 hours under reduced pressure of 50 mmHg and at 130° C. for 3 hours under reduced pressure of 30 mmHg while distilling off water out of the reaction system. The polymer in the reaction mass had a weight average molecular weight of 5,000. Successively, 0.6 g of ethyl cellulose having a weight average molecular weight of 67,000 and ethoxylation degree of 39% (substitution degree of 1.9) was added, a Dean Stark trap was mounted on the reactor, and an azeotropic dehydration reaction was carried out to remove water at 140° C. for 8 hours under reduced pressure of 24 mmHg. The Dean Stark trap was dismantled and a tube packed with 50 g of molecular sieve 3A and 73.0 g of diphenyl ether having a moisture content of 10 ppm or less was mounted on the reactor so as to return distilled solvent to the reaction system after passing through the molecular sieve layer. The reaction further continued at 130° C. for 20 hours under reduced pressure of 15 mmHg by heating and stirring while protecting the system from contamination by water.

The solvent after passing through the molecular sieve had a moisture content of 2 ppm. The reaction mixture was cooled at 30° C., 800 ml of a 0.7% hydrochloric acid/isopropyl alcohol solution was added, stirred for an hour and filtered with suction. Such filtration operation was carried out twice to remove tin powder. The filter cake was stirred with 600 ml of isopropyl alcohol and suction-filtered. Such operation was repeated until the filtrate became neutral. Successively the cake was washed with hexane and dried at 60° C. with hot air to obtain 53.2 g (82% yield) of a copolymer.

The copolymer thus obtained had a weight average molecular weight of 307,000, and also had a glass transition temperature of 58.1° C. and melting point of 156.4° C. by differential thermal analysis.

The copolymer was hot-pressed at 180° C. to prepare a film. The film had a thickness of 147–153 μm, tensile strength of 600 kg/cm² (break point), elongation of 7%, transparency (Haze) of less than 1%, and melt tension of MT-value of 8.5(g) and MI-value of 2.0(g/10 min.). The film was greatly deteriorated in the degradation test and the strength of the film could not be measured after the test.

Example 4

A mixture of 89.3 g of 90% L-lactic acid, 300 g of diphenyl ether and 0.37 of tin powder was heated with stirring at 130° C. for 3 hours under reduced pressure of 50 mmHg and at 130° C. for 3 hours under reduced pressure of 30 mmHg while distilling off water out of the reaction system. The polymer in the reaction mass had a weight average molecular weight of 5,000. Successively, 1.9 g of ethyl cellulose having a weight average molecular weight of 67,000 and ethoxylation degree of 39% (substitution degree of 1.9) was added, a Dean Stark trap was mounted on the reactor, and an azeotropic dehydration reaction was carried out to remove water at 140° C. for 8 hours under reduced pressure of 24 mmHg. The Dean Stark trap was dismantled and a tube packed with 50 g of molecular sieve 3A and 73.0 g of diphenyl ether having a moisture content of 10 ppm or less was mounted on the reactor so as to return distilled solvent to the reaction system after passing through the molecular sieve layer. The reaction further continued at 130° C. for 20 hours under reduced pressure by 15 mmHg by heating and stirring while protecting the system from contamination by water.

The solvent after passing through the molecular sieve had a moisture content of 2 ppm. The reaction mixture was cooled at 30° C., 800 ml of a 0.7% hydrochloric acid/isopropyl alcohol solution was added, stirred for an hour and filtered with suction. Such filtration operation was carried out twice to remove tin powder. The filter cake was stirred with 600 ml of isopropyl alcohol and suction-filtered. Such operation was repeated until the filtrate became neutral. Successively the cake was washed with hexane and dried at 60° C. with hot air to obtain 53.0 g (80% yield) of a copolymer.

The copolymer thus obtained had a weight average molecular weight of 350,000, and also had a glass transition temperature of 57.6° C. and melting point of 156.0° C. by differential thermal analysis.

The copolymer was hot-pressed at 180° C. to prepare a film. The film had a thickness of 143–150 μm, tensile strength of 590 kg/cm² (break point), elongation of 8%, transparency (Haze) of less than 1%, and melt tension of MT-value of 13.5(g) and MI-value of 6.8(g/10 min.). The film was greatly deteriorated in the degradation test and the strength of the film could not be measured after the test.

Example 5

A mixture of 89.3 g of 90% L-lactic acid and 0.37 g of tin powder was heated with stirring at 130° C. for 3 hours under reduced pressure of 50 mmHg and at 130° C. for 2 hours under reduced pressure of 30 mmHg while distilling off water from the reaction system. Successively, 300 g of o-dichlorobenzene was added, a Dean Stark trap was mounted on the reactor, and an azeotropic dehydration reaction was carried out to remove water at 140° C. for 8 hours under reduced pressure of 250 mmHg. The polymer in the reaction mass had a weight average molecular weight of 20,000. Thereafter, 0.6 g of ethyl cellulose having a weight average molecular weight of 67,000 and ethoxylation degree of 39% (substitution degree of 1.9) was added, the Dean Stark trap was dismantled, a tube packed with 50 g of molecular sieve 3A and 73.0 g of o-dichlorobenzene having a moisture content of 10 ppm or less was mounted on the reactor so as to return distilled solvent to the reaction system after passing through the molecular sieve layer. The reaction was further continued at 130° C. for 20 hours under reduced pressure of 180 mmHg by heating and stirring while protecting the system from contamination by water.

The solvent after passing through the molecular sieve had a moisture content of 2 ppm. The reaction mixture was cooled at 30° C., 800 ml of a 0.7% hydrochloric acid/isopropyl alcohol solution was added, stirred for an hour and filtered with suction. Such filtration operation was carried out twice to remove tin powder. The filter cake was stirred with 600 ml of isopropyl alcohol and suction-filtered. Such operation was repeated until the filtrate became neutral. Successively the cake was washed with hexane and dried at 60° C. with hot air to obtain 51.5 g (79% yield) of a copolymer.

The copolymer thus obtained had a weight average molecular weight of 283,000, and also had a glass transition temperature of 58.0° C. and melting point of 156.3° C. by differential thermal analysis.

The copolymer was hot-pressed at 180° C. to prepare a film. The film had a thickness of 145–150 μm, tensile strength of 580 kg/cm$^2$ (break point), elongation of 8%, transparency (Haze) of less than 1%, and melt tension of MT-value of 8.6(g) and MI-value of 2.3(g/10 min.). The film was greatly deteriorated in the degradation test and the strength of the film could not be measured after the test.

Example 6

A mixture of 89.3 g of 90% L-lactic acid and 0.37 g of tin powder was heated with stirring to prepare an oligomer at 130° C. for 3 hours under reduced pressure of 50 mmHg and at 130° C. for 3 hours under reduced pressure of 30 mmHg while distilling off water from the reaction system. Successively, 300 g of o-dichlorobenzene was added, a Dean Stark trap was mounted on the reactor, and an azeotropic dehydration reaction was carried out at 140° C. for 8 hours under reduced pressure of 250 mmHg while removing water. The Dean Stark trap was dismantled, a tube packed with 50 g of molecular sieve 3A and 73.0 g of o-dichlorobenzene having a moisture content of 10 ppm or less was mounted on the reactor so as to return distilled solvent to the reaction system after passing through the molecular sieve layer. The reaction was further continued at 130° C. for 8 hours under reduced pressure of 180 mmHg by heating and stirring while protecting the system from contamination by water. The polymer had a weight average molecular weight of 60,000. Thereafter, 0.6 g of ethyl cellulose having a weight average molecular weight of 67,000 and ethoxylation degree of 39% (substitution degree of 1.9) was added and the reaction was further continued at 130° C. for 15 hours under reduced pressure of 180 mmHg.

The solvent after passing through the molecular sieve had a moisture content of 2 ppm. The reaction mixture was cooled to 30° C., 800 ml of a 0.7% hydrochloric acid/isopropyl alcohol solution was added, stirred for an hour and filtered with suction. Such filtration operation was carried out twice to remove tin powder. The filter cake was stirred with 600 ml of isopropyl alcohol and suction-filtered. Such operation was repeated until the filtrate became neutral. Successively the cake was washed with hexane and dried at 60° C. with hot air to obtain 52.5 g (81% yield) of a copolymer.

The copolymer thus obtained had a weight average molecular weight of 345,000, and also had a glass transition temperature of 57.5° C. and melting point of 157.0° C. by differential thermal analysis.

The copolymer was hot-pressed at 180° C. to prepare a film. The film had a thickness of 145–150 μm, tensile strength of 600 kg/cm$^2$, elongation of 7%, transparency (Haze) of less than 1%, and melt tension of MT-value of 9.0(g) and 2.5(g/10 min.). The film was greatly deteriorated in the degradation test and the strength of the film could not be measured after the test.

Example 7

A reaction vessel equipped with a stirrer, vacuum line, temperature control unit and a solvent reflux line capable of connecting with a tube packed with molecular sieve 5A was used.

To the reaction vessel, 22.9 g of ethylene glycol, 35.4 g of succinic acid, 0.427 g of acetyl cellulose having a weight average molecular weight of 30,000 and substitution degree of 2.4, and 0.216 g of metallic tin were charged. The polymerization reaction was carried out at 150° C. for 7 hours under atmospheric pressure, successively at 150 ° C. for 4 hours under reduced pressure of 10 mmHg and finally at 150° C. for 4 hours under reduced pressure of 4 mmHg while distilling water out of the reaction system.

Thereafter, 129.7 g of diphenyl ether was added to the reaction system and a tube packed with 20 g of molecular sieve 5A was mounted on the reaction vessel so as to return distilled solvent to the reaction system after passing through the molecular sieve layer.

The reaction was successively continued at 130° C. for 45 hours under reduced pressure of 15 mmHg.

After finishing the reaction, the reaction mass was dissolved by adding 500 ml of chloroform. The mixture obtained was filtered and the filtrate was added to 5,500 ml of acetone. The reprecipitated solid was recovered by filtration in the form of residue.

The residue was added to 600 ml of a 1% hydrochloric acid/isopropyl alcohol solution, stirred for an hour, and filtered with suction to remove dissolved tin.

The filtration residue obtained after removing tin was added to 600 ml of fresh isopropyl alcohol, thoroughly stirred and suction-filtered. Such washing operation was repeated until the filtrate became neutral. After washing, the solid was dried at 60° C. in a hot air. The copolymer thus obtained was 35.8 g (82% yield) and had a weight average molecular weight of 164,000.

The copolymer obtained was hot-pressed at 170° C. to prepare a film. The film had a thickness of 100 μm, tensile strength of 180 kg/cm$^2$ (yield), elongation of 650%, and melt tension of MT-value of 2.8(g) and MI-value of 16.0(g/10 min.). The film was greatly deteriorated in the degradation test and strength of the film could not be measured after the degradation test.

Example 8

The reaction vessel used was the same as used in Example 7.

To the reaction vessel, 41.0 g of 1,4-butanediol, 53.1 g of succinic acid and 0.774 g of stannous oxide were charged. The polymerization reaction was carried out at 150° C. for 2.5 hours under atmospheric pressure and successively at 150° C. for 0.5 hour under reduced pressure of 15 mmHg while distilling water out of the reaction system. Further, 232 g of o-dichlorobenzene was added to the reaction system, and a tube packed with 20 g of molecular sieve 5A was mounted on the reaction vessel so as to return distilled solvent to the reaction vessel after passing through the molecular sieve layer. The reaction was successively carried out at 110° C. for 7 hours under reduced pressure of 100 mmHg. Thereafter, 0.782 g of acetyl cellulose having a weight average molecular weight of 30,000 and substitution degree of 2.4 was added to the reaction vessel and the reaction was further continued at 110° C. for 15 hours under reduced pressure of 100 mmHg.

After finishing the reaction, the reaction mass was crystallized by mixing with 465 g of o-dichlorobenzene.

The crystallized solid was recovered by filtration in the form of residue.

The residue was added to 600 ml of a 1% hydrochloric acid/isopropyl alcohol solution, stirred for an hour, and filtered with suction to remove dissolved tin.

The filtration residue obtained after removing tin was added to 600 ml of fresh isopropyl alcohol, thoroughly stirred and suction-filtered. Such washing operation was repeated until the filtrate became neutral. After washing, the solid was dried at 60° C. in a hot air. The copolymer thus obtained was 64.0 g (83% yield) and had a weight average molecular weight of 177,000.

The copolymer obtained was hot-pressed at 170° C. to prepare a film. The film had a thickness of 100 μm, tensile strength of 330 kg/cm$^2$ (yield), elongation of 420%, and melt tension of MT-value of 3.0(g) and MI-value of 17.0(g/10 min.). The film was greatly deteriorated in the degradation test and strength of the film could not be measured after the degradation test.

Example 9

A mixture of 130.6 g of 90% L-lactic acid, 300 g of diphenyl ether, 0.37 g of tin powder, and 1.0 g of acetyl cellulose having a weight average molecular weight of 30,000 and substitution degree of 2.4 was heated with stirring to carry out oligomerization at 130° C. for 3 hours under reduced pressure of 50 mmHg and then at 130° C. for 3 hours under reduced pressure of 30 mmHg while distilling off water out of the reaction system. Successively, a Dean Stark trap was mounted on the reactor and an azeotropic dehydration reaction was carried out to remove water at 140° C. for 8 hours under reduced pressure of 24 mmHg. The polymer in the reaction mass after azeotropic dehydration had a weight average molecular weight of 154,000. Further, 5.0 g of polybutylene succinate having a weight average molecular weight of 112,000 was added, the Dean Stark trap was dismantled, and a tube packed with 50 g of molecular sieve 3A and 73.0 g of diphenyl ether having a moisture content of 10 ppm or less was mounted on the reactor so as to return distilled solvent to the reaction system after passing through the molecular sieve layer. The reaction was continued with heating and stirring at 130° C. for 20 hours under reduced pressure of 13 mmHg while protecting the reaction system from contamination of water.

The solvent after passing through the molecular sieve layer had a moisture content of 2 ppm. The reaction mixture was added to 800 ml of a 0.7% hydrochloric acid/isopropyl alcohol solution, stirred for an hour and filtered with suction. Such filtration operation was carried out twice to remove tin powder.

The filter cake was stirred with 600 ml of isopropyl alcohol and filtered with suction. Such operation was repeated until the filtrate became neutral. Successively the cake was washed with hexane and dried at 60° C. with hot air to obtain 85.2 g (85.2% yield) of a copolymer.

The copolymer obtained had a weight average molecular weight of 539,000, and exhibited a glass transition temperature of 48.0° C. and melting point of 156.0° C. by differential thermal analysis.

The copolymer obtained was hot-pressed at 180° C. to prepare a film. The film had following properties. Transparency and heat resistance were measured on specimens which were heat-treated at 80° C. for 15 minutes.

Thickness: 147–153 μm

Tensile strength: 630 kg/cm$^2$ (break)

Elongation: 7%

Transparency (Haze): 6.1%

Heat-resistance (120° C.):<5%

Melt-tension (MT-value): 7.6 (g)
  (MI-value): 11.0 (g/10 min.)

Flexural strength: 800 kg/cm$^2$

Flexural modulus: 33,000 kg/cm$^2$

Dead fold after bending test: no (No microcrack was found)

The film was greatly deteriorated in the degradation test and the strength of the film could not be measured after the test.

Example 10

A mixture of 109.7 g of 90% L-lactic acid, 300 g of dichlorobenzene, 0.37 g of tin powder, and 1.0 g of acetyl cellulose having a weight average molecular weight of 30,000 and substitution degree of 2.4 was heated with stirring to carry out oligomerization at 140° C. for 3 hours under reduced pressure of 400 mmHg and then at 140° C. for 3 hours under reduced pressure of 300 mmHg while distilling off water from the reaction system. Successively, a Dean Stark trap was mounted on the reactor and an azeotropic dehydration reaction was carried out to remove water at 140° C. for 8 hours under reduced pressure of 200 mmHg. The polymer in the reaction mass after azeotropic dehydration had a weight average molecular weight of 45,000. Further, 20.0 g of polybutylene succinate having a weight average molecular weight of 154,000 was added, the Dean Stark trap was dismantled, and a tube packed with 50 g of molecular sieve 3A and 85.0 g of o-dichlorobenzene having a moisture content of 10 ppm or less was mounted on the reactor so as to return distilled solvent to the reaction system after passing through the molecular sieve layer. The reaction was continued with heating and stirring at 140° C. for 18 hours under reduced pressure of 200 mmHg while protecting the reaction system from contamination by water.

The solvent after passing through the molecular sieve layer had a moisture content of 2 ppm. The reaction mixture was added to 800 ml of a 0.7% hydrochloric acid/isopropyl alcohol solution, stirred for an hour and filtered with suction. Such filtration operation was carried out twice to remove tin powder.

The filter cake was stirred with 600 ml of isopropyl alcohol and filtered with suction. Such operation was repeated until the filtrate became neutral. Successively, the cake was washed with hexane and dried at 60° C. with hot air to obtain 83.4 g (83.4% yield) of a copolymer.

The copolymer obtained had a weight average molecular weight of 496,000, and exhibited a glass transition temperature of 31.0° C. and melting point of 156.0° C. by differential thermal analysis.

The copolymer obtained was hot-pressed at 180° C. to prepare a film. The film had following properties. Transparency and heat resistance were measured on specimens which were heat-treated at 80° C. for 15 minutes.

Thickness: 122–136/μm

Tensile strength: 380 kg/cm$^2$ (yield)
  250 kg/cm$^2$ (break)

Elongation: 310%

Transparency (Haze): 9.0%

Heat-resistance (120° C.):<5%

Melt-tension (MT-value): 16.5 (g)
(MI-value): 4.7 (g/10 min.)

Flexural strength: 370 kg/cm$^2$

Flexural modulus: 14,000 kg/cm$^2$

Dead fold after bending test: no (No microcrack was found)

The film was greatly deteriorated in the degradation test and the strength of the film could not be measured after the test.

Example 11

A mixture of 130.6 g of 90% L-lactic acid, 300 g of o-dichlorobenzene and 0.37 g of tin powder was heated with stirring to carry out oligomerization at 140° C. for 3 hours under reduced pressure of 400 mmHg and then at 140° C. for 3 hours under reduced pressure of 300 mmHg while distilling off water from the reaction system. Successively, 1.0 g of ethyl cellulose having a weight average molecular weight of 30,000 and substitution degree of 1.9 was added, a Dean Stark trap was mounted on the reactor, and an azeotropic dehydration reaction was carried out to remove water at 140° C. for 8 hours under reduced pressure of 250 mmHg. The polymer in the reaction mass after azeotropic dehydration had a weight average molecular weight of 45,000. Further, 5.0 g of polybutylene succinate having a weight average molecular weight of 150,000 was added, the Dean Stark trap was dismantled, and a tube packed with 50 g of molecular sieve 3A and 85.0 g of o-dichlorobenzene having a moisture content of 10 ppm or less was mounted on the reactor so as to return distilled solvent to the reaction system after passing through the molecular sieve layer. The reaction was continued with heating and stirring at 140° C. for 22 hours under reduced pressure of 250 mmHg while protecting the reaction system from contamination by water.

The solvent after passing through the molecular sieve layer had a moisture content of 2 ppm. The reaction mixture was added to 800 ml of a 0.7% hydrochloric acid/isopropyl alcohol solution, stirred for an hour and filtered with suction. Such filtration operation was carried out twice to remove tin powder.

The filter cake was stirred with 600 ml of isopropyl alcohol and filtered with suction. Such operation was repeated until the filtrate became neutral. Successively, the cake was washed with hexane and dried at 60° C. with hot air to obtain 87.8 g (87.8% yield) of a copolymer.

The copolymer obtained had a weight average molecular weight of 236,000, and exhibited a glass transition temperature of 54.3° C. and melting point of 159.7° C. by differential thermal analysis.

The copolymer obtained was hot-pressed at 180° C. to prepare a film. The film had following properties. Transparency and heat resistance were measured on specimens which were heat-treated at 80° C. for 15 minutes.

Thickness: 122–136 μm

Tensile strength: 660 kg/cm$^2$ (break)

Elongation: 7%

Transparency (Haze): 7.0%

Heat-resistance (120° C.):<5%

Melt-tension (MT-value): 6.5 (g)
(MI-value): 5.0 (g/10 min.)

Flexural strength: 740 kg/cm$^2$

Flexural modulus: 30,000 kg/cm$^2$

Dead fold after bending test: no (no microcrack)

The film was greatly deteriorated in the degradation test and the strength of the film could not be measured after the test.

Example 12

A mixture of 109.7 g of 90% L-lactic acid, 300 g of o-dichlorobenzene and 0.37 g of tin powder was heated with stirring to carry out oligomerization at 140° C. for 3 hours under reduced pressure of 400 mmHg and then at 140° C. for 3 hours under reduced pressure of 300 mmHg while distilling off water from the reaction system. Successively, a Dean Stark trap was mounted on the reactor and an azeotropic dehydration reaction was carried out to remove water at 140° C. for 8 hours under reduced pressure of 250 mmHg. The Dean Stark trap was dismantled and a tube packed with 50 g of molecular sieve 3A and 85.0 g of o-dichlorobenzene having a moisture content of 10 ppm or less was mounted on the reactor so as to return distilled water to the reaction system after passing through the molecular sieve layer. The reaction was carried out with heating and stirring at 140° C. for 28 hours under reduced pressure of 200 mmHg while protecting the reaction system from contamination by water. The polymer in the reaction mass had a weight average molecular weight of 154,000. Further, 20.0 g of polybutylene succinate having a weight average molecular weight of 150,000 and 1.0 g of ethyl cellulose having a weight average molecular weight of 30,000 and substitution degree of 1.9 were added at the same time, and the reaction was continued with heating and stirring at 140° C. for 22 hours under reduced pressure of 250 mmHg while protecting the reaction system from contamination by water.

The solvent after passing through the molecular sieve layer had a moisture content of 2 ppm. The reaction mixture was added to 800 ml of a 0.7% hydrochloric acid/isopropyl alcohol solution, stirred for an hour and filtered with suction. Such filtration operation was carried out twice to remove tin powder.

The filter cake was stirred with 600 ml of isopropyl alcohol and filtered with suction. Such operation was repeated until the filtrate became neutral. Successively, the cake was washed with hexane and dried at 60° C. with hot air to obtain 85.7 g (85.7% yield) of a copolymer.

The copolymer obtained had a weight average molecular weight of 224,000, and exhibited a glass transition temperature of 45.0° C. and melting point of 156.0° C. by differential thermal analysis.

The copolymer obtained was hot-pressed at 180° C. to prepare a film. The film had following properties. Transparency and heat resistance were measured on specimens which were heat-treated at 80° C. for 15 minutes.

Thickness: 122–136 μm

Tensile strength: 400 kg/cm$^2$ (yield)
300 kg/cm$^2$ (break)

Elongation: 250%

Transparency (Haze): 9.0%

Heat-resistance (120° C.):<5%

Melt-tension (MT-value): 14.5 (g)
(MI-value): 6.1 (g/10 min.)

Flexural strength: 390 kg/cm$^2$

Flexural modulus: 17,000 kg/cm$^2$

Dead fold after bending test: no (no microcrack)

The film was greatly deteriorated in the degradation test and the strength of the film could not be measured after the test.

Example 13

A mixture of 89.3 g of 90% L-lactic acid, 300 g of diphenyl ether, 0.37 g of tin powder and 1.0 g of acetyl cellulose having a weight average molecular weight of 501.000 and substitution degree of 2.4, was heated with stirring at 130° C. for 3 hours under reduced pressure of 50 mmHg and thereafter at 130° C. for 3 hours under reduced pressure of 30 mmHg while distilling water out of the reaction system in order to prepare an oligomer. A Dean Stark Trap was mounted on the reactor and an azeotropic dehydration reaction was carried out at 140° C. for 8 hours under reduced pressure of 24 mmHg while distilling out generated water. Successively, the Dean Stark trap was dismantled and a tube packed with 50 g of molecular sieve 3A and 73.0 g of diphenyl ether having a moisture content of 10 ppm or less was mounted so as to return the distilled solvent to the reaction system after passing through the molecular sieve layer. The reaction was further continued at 130° C. for 9 hours under reduced pressure of 13 mmHg by heating and stirring the mixture while preventing contamination by water into the reaction system.

The solvent after passing through the molecular sieve had a moisture content of 2 ppm. To the reaction mixture, 800 ml of a 0.7% hydrochloric acid/isopropyl alcohol solution was added, stirred for an hour and filtered with suction. Such filtration operation was carried out twice to remove tin powder.

The filter cake was stirred with 600 ml of isopropyl alcohol and suction-filtered. Such operation was repeated until the filtrate became neutral. Successively the cake was washed with hexane and dried at 60° C. with hot air to obtain 57.8 g (87.2% yield) of a copolymer.

The copolymer thus obtained had a weight average molecular weight of 728,000. As a result of differential thermal analysis, the copolymer had a glass transition temperature of 58.4° C. and melting point of 156.7° C.

The copolymer thus obtained was hot-pressed at temperature of 180° C. to prepare a pressed film. The film prepared had following properties:

Thickness: 147–153 $\mu$m

Tensile strength: 630 kg/cm$^2$ (break)

Elongation: 7%

Transparency (Haze):<1%

Melt-tension (MT-value): 14.1 g
  (MI-value): 6.1 (g/10 min.)

Flexural strength: 800 kg/cm$^2$

Flexural modulus: 33,000 kg/cm$^2$

Dead fold after bending test: no (no microcrack)

The film was deteriorated in the degradation test and the strength of the film could not be measured after the test.

Example 14

A mixture of 109.7 g of 90% L-lactic acid, 300 g of o-dichlorobenzene, 0.37 g of tin powder, and 1.0 g of acetyl cellulose having a weight average molecular weight of 501,000 and substitution degree of 2.4 was heated with stirring to carry out oligomerization at 140° C. for 3 hours under reduced pressure of 400 mmHg and then at 140° C. for 3 hours under reduced pressure of 300 mmHg while distilling off water from the reaction system. Successively, a Dean Stark trap was mounted on the reactor and an azeotropic dehydration reaction was carried out to remove water at 140° C. for 8 hours under reduced pressure of 250 mmHg. The polymer in the reaction mass after azeotropic dehydration had a weight average molecular weight of 50,000. Further, 20.0 g of polybutylene succinate having a weight average molecular weight of 150,000 was added, the Dean Stark trap was dismantled, and a tube packed with 50 g of molecular sieve 3A and 85.0 g of o-dichlorobenzene having a moisture content of 10 ppm or less was mounted on the reactor so as to return distilled solvent to the reaction system after passing through the molecular sieve layer. The reaction was continued with heating and stirring at 140° C. for 19 hours under reduced pressure of 250 mmHg while protecting the reaction system from contamination of water.

The solvent after passing through the molecular sieve layer had a moisture content of 2 ppm. The reaction mixture was added to 800 ml of a 0.7% hydrochloric acid/isopropyl alcohol solution, stirred for an hour and filtered with suction. Such filtration operation was carried out twice to remove tin powder.

The filter cake was stirred with 600 ml of isopropyl alcohol and filtered with suction. Such operation was repeated until the filtrate became neutral. Successively, the cake was washed with hexane and dried at 60° C. with hot air to obtain 85.7 g (85.7% yield) of a copolymer.

The copolymer obtained had a weight average molecular weight of 490,000, and exhibited a glass transition temperature of 32.0° C. and melting point of 157.1° C. by differential thermal analysis.

The copolymer obtained was hot-pressed at 180° C. to prepare a film. The film had following properties. Transparency and heat resistance were measured on specimens which were heat-treated at 80° C. for 15 minutes.

Thickness: 122–136 $\mu$m

Tensile strength: 390 kg/cm$^2$ (yield)
  260 kg/cm$^2$ (break)

Elongation: 305%

Transparency (Haze): 9.0%

Heat-resistance (120° C.):<5%

Melt-tension (MT-value): 15.5 (g)

(MI-value): 5.0 (g/10 min.)

Flexural strength: 390 kg/cm$^2$

Flexural modulus: 15,000 kg/cm$^2$

Dead fold after bending test: no (No microcrack was found)

The film was greatly deteriorated in the degradation test and the strength of the film could not be measured after the test.

Example 15

A mixture of 109.7 g of 90% L-lactic acid, 300 g of o-dichlorobenzene and 0.37 g of tin powder was heated with stirring to carry out oligomerization at 140° C. for 3 hours under reduced pressure of 400 mmHg and then at 140° C. for 3 hours under reduced pressure of 300 mmHg while distilling off water from the reaction system. Successively, a Dean Stark trap was mounted on the reactor and an azeotropic dehydration reaction was carried out to remove water at 140° C. for 8 hours under reduced pressure of 250 mmHg. The Dean Stark trap was dismantled and a tube packed with 50 g of molecular sieve 3A and 85.0 g of o-dichlorobenzene having a moisture content of 10 ppm or less was mounted on the reactor so as to return distilled water to the reaction system after passing through the molecular sieve layer. The reaction was carried out with heating and stirring at 140° C. for 28 hours under reduced pressure of 200 mmHg while protecting the reaction system from contamination by water.

The polymer in the reaction mass had a weight average molecular weight of 154,000. Further, 20.0 g of polybutylene succinate having a weight average molecular weight of 150,000 and 1.0 g of ethyl cellulose having a weight average molecular weight of 67,000 and substitution degree of 1.9 were added at the same time, and the reaction was continued with heating and stirring at 140° C. for 22 hours under reduced pressure of 250 mmHg while protecting the reaction system from contamination of water.

The solvent after passing through the molecular sieve layer had a moisture content of 2 ppm. The reaction mixture was added to 800 ml of a 0.7% hydrochloric acid/isopropyl alcohol solution, stirred for an hour and filtered with suction. Such filtration operation was carried out twice to remove tin powder.

The filter cake was stirred with 600 ml of isopropyl alcohol and filtered with suction. Such operation was repeated until the filtrate became neutral. Successively, the cake was washed with hexane and dried at 60° C. with hot air to obtain 84.7 g (84.7% yield) of a copolymer.

The copolymer obtained had an weight average molecular weight of 214,000, and exhibited a glass transition temperature of 44.0° C. and melting point of 155.0° C. by differential thermal analysis.

The copolymer obtained was hot-pressed at 180° C. to prepare a film. The film had following properties. Transparency and heat resistance were measured on specimens which were heat-treated at 80° C. for 15 minutes.

Thickness: 122–136 μm
Tensile strength: 410 kg/cm$^2$ (yield)
   310 kg/cm$^2$ (break)
Elongation: 240%
Transparency (Haze): 9.0%
Heat-resistance (120° C.):<5%
Melt-tension (MT-value): 13.5 (g)
   (MI-value): 6.5 (g/10 min.)
Flexural strength: 400 kg/cm$^2$
Flexural modulus: 18,000 kg/cm$^2$
Dead fold after bending test: no (no microcrack)

The film was greatly deteriorated in the degradation test and the strength of the film could not be measured after the test.

Example 16

A mixture of 109.7 g of 90% L-lactic acid, 300 g of o-dichlorobenzene and 0.37 g of tin powder was heated with stirring to prepare an oligomer at 140° C. for 3 hours under reduced pressure of 400 mmHg and at 140° C. for 3 hours under reduced pressure of 300 mmHg while distilling off water from the reaction system. Successively, a Dean Stark trap was mounted on the reactor, and an azeotropic dehydration reaction was carried out at 140° C. for 8 hours under reduced pressure of 250 mmHg while removing water. The Dean Stark trap was dismantled, a tube packed with 50 g of molecular sieve 3A and 85.0 g of o-dichlorobenzene having a moisture content of 10 ppm or less was mounted on the reactor so as to return distilled solvent to the reaction system after passing through the molecular sieve layer. The reaction was further continued at 140° C. for 10 hours under reduced pressure of 200 mmHg by heating and stirring while protecting the system from contamination by water. The polymer in the reaction mass had a weight average molecular weight of 54,000. Thereafter, 4.2 g of ethyl cellulose having a weight average molecular weight of 67,000 and substitution degree of 1.9 was added and the reaction was further continued at 140° C. for 15 hours under reduced pressure of 250 mmHg.

The solvent after passing through the molecular sieve had a moisture content of 2 ppm. To the reaction mixture, 800 ml of a 0.7% hydrochloric acid/isopropyl alcohol solution was added, stirred for an hour and filtered with suction. Such filtration operation was carried out twice to remove tin powder. The filter cake was stirred with 600 ml of isopropyl alcohol and suction-filtered. Such operation was repeated until the filtrate became neutral. Successively the cake was washed with hexane and dried at 60° C. with hot air to obtain 70.5 g (84.7% yield) of a copolymer.

The copolymer thus obtained had a weight average molecular weight of 430,000, and also had a glass transition temperature of 56.8° C. and melting point of 159.2° C. by differential thermal analysis.

The copolymer was hot-pressed at 180° C. to prepare a film. The film had following properties.

Thickness: 122–136 μm
Tensile strength: 650 kg/cm$^2$
Elongation: 7%
Transparency (Haze): 1.0%
Melt-tension (MT-value): 2.8 (g)
   (MI-value): 18.0 (g/10 min.)
Flexural strength: 670 kg/cm$^2$
Flexural modulus: 33,000 kg/cm$^2$
Dead fold after bending test: no (no microcrack)

The film was greatly deteriorated in the degradation test and the strength of the film could not be measured after the test.

The film prepared in the example 16 was an amorphous film having a crystallinity of 0% by X-ray diffraction. FIG. 1 shows DSC measuring results of the film together with the results an amorphous poly-L-lactic acid film. Poly-L-lactic acid is first crystallized at about 130° C. and thereafter exhibits melting point at about 160° C. On the other hand, the copolymer of the example comprising 5% of ethyl cellulose does not crystallize at such temperatures and neither crystallization peak (Tc) nor melting peak (Tm) are exhibited.

A preparation test on these films was also carried out at 55° C. for 5 days under 90% relative humidity. The poly-L-lactic acid film became opaque and had a crystallinity of 40% or more. On the other hand, the copolymer film of the example maintained transparency and had a crystallinity of 0%.

Further, both films were stretched 3 times in one direction at 70° C. and DSC was measured on these stretched films. Poly-L-lactic acid film increased Tg to 72° C. and decreased Tc to 76° C. after stretching. Consequently, even though further stretching is applied to the rectangular direction (2nd axis) to the 1st axis, the film was broken and could not be stretched. On the other hand, the film of the copolymer in the invention had Tg of 71° C. and Tc of 91° C., even after the 1st stretching and the 2nd stretching could be carried out at 80° C.

Comparative Example 1
(Polylactic acid)

Polylactic acid having a weight average molecular weight of 143,000 was hot-pressed at 180° C. to prepare a film. The film had following properties.

Thickness: 122–136 μm
Tensile strength: 570 kg/cm$^2$ (break)

Elongation: 7%

Transparency (Haze):<1%

Melt-tension (MT-value): 0.6 (g)
(MI-value): 6.3 (g/10 min.)

The film was greatly deteriorated in the degradation test and the strength of the film could not be measured after the test.

Comparative Example 2
(Polylactic acid)

Polylactic acid having a weight average molecular weight of 143,000 was hot-pressed at 180° C. to prepare a film. Transparency and heat resistance are evaluated after the film heat-treated at 80° C. for 15 minutes.

The film had following properties.

Thickness: 122–136 μm

Tensile strength: 660 kg/cm² (break)

Elongation: 7%

Transparency (Haze): 33.3%

Heat resistance: 100%<

Melt-tension (MT-value): 0.6 (g)
(MI-value): 6.3 (g/10 min.)

Flexural strength: 950 kg/cm²

Flexural modulus: 36,000 kg/cm²

Dead fold after bending test: no (Microcracks were found)

Comparative Example 3
(Blend of polylactic acid and ethyl cellulose)

Polylactic acid having a weight average molecular weight of 143,000 and ethyl cellulose having a weight average molecular weight of 146,000 and ethoxylation degree of 39% (substitution degree 1.9) were blended in a proportion of 97:3 by weight and thoroughly kneaded at 180° C. for 10 minutes by using a plastomill. The blend-polymer of polylactic acid and ethyl cellulose had a weight average molecular weight of 143,000.

The blend-polymer was hot-pressed at 180° C. to prepare a film. The film had following properties.

Thickness: 135–142 μm

Tensile strength: 570 kg/cm² (break)

Elongation: 7%

Transparency (Haze):<1%

Melt-tension (MT-value): 0.6 (g)
(MI-value): 6.3 (g/10 min.)

The film was greatly deteriorated in the degradation test and the strength of the film could not be measured after the test.

Comparative Example 4
(Polyethylene succinate)

The same reaction vessel as used in Example 7 was employed.

To the reaction vessel, 22.9 g of ethylene glycol, 35.4 g of succinic acid, and 0.216 g of metallic tin were charged. The polymerization reaction was carried out at 150° C. for 7 hours under atmospheric pressure, successively at 150° C. for 4 hours under reduced pressure of 10 mmHg and finally at 150° C. for 4 hours under reduced pressure of 4 mmHg while distilling water out of the reaction system.

Thereafter, 129.7 g of diphenyl ether was added to the reaction system and a tube packed with 20 g of molecular sieve 5A was mounted on the reaction vessel so as to return distilled solvent to the reaction system after passing through the molecular sieve layer.

The reaction was successively continued at 130° C. for 57 hours under reduced pressure of 15 mmHg.

After finishing the reaction, the reaction mass was dissolved by adding 500 ml of chloroform and filtered. The filtrate was mixed with 5,800 ml of acetone to precipitate solid. The precipitated solid was recovered by filtration in the form of residue.

The residue was added to 600 ml of a 1% hydrochloric acid/isopropyl alcohol solution, stirred for an hour, and filtered with suction to remove dissolved tin.

The filtration residue obtained after removing tin was added to 600 ml of fresh isopropyl alcohol, thoroughly stirred and suction-filtered. Such washing operation was repeated until the filtrate became neutral. After washing, the solid was dried at 60° C. in a hot air. Polyethylene succinate thus obtained was 36.8 g (85% yield) and had a weight average molecular weight of 152,000.

Polyethylene succinate obtained was hot-pressed at 170° C. to prepare a film. The film had a thickness of 100 μm, tensile strength of 180 kg/cm² (yield), elongation of 660%, and melt tension of MT-value of 0.5(g) and MI-value of 4.8(g/10 min.). The film was greatly deteriorated in the degradation test and strength of the film could not be measured after the degradation test.

Comparative Example 5
(Polybutylene succinate)

The reaction vessel employed was the same as used in Example 7.

To the reaction vessel, 41.0 g of 1,4-butanediol, 53.1 g of succinic acid, and 0.774 g of stannous oxide were charged. The polymerization reaction was carried out at 150° C. for 2.5 hours under atmospheric pressure and successively at 150° C. for 0.5 hour under reduced pressure of 15 mmHg while distilling water out of the reaction system. Further, 232 g of diphenyl ether was added to the reaction system, and a tube packed with 20 g of molecular sieve 5A was mounted on the reaction vessel so as to return distilled solvent to the reaction vessel after passing through the molecular sieve layer. The reaction was successively carried out at 110° C. for 20 hours under reduced pressure of 100 mmHg.

After finishing the reaction, the reaction mass was crystallized by mixing with 465 g of o-dichlorobenzene. The crystallized solid was recovered by filtration in the form of residue.

The residue was added to 600 ml of a 1% hydrochloric acid/isopropyl alcohol solution, stirred for an hour, and filtered with suction to remove tin.

The filtration residue obtained after removing tin was added to 600 ml of fresh isopropyl alcohol, thoroughly stirred and suction-filtered. Such washing operation was repeated until the filtrate became neutral. After washing, the solid was dried at 600° C. in a hot air. Polybutylene succinate thus obtained was 65.0 g (84% yield) and had a weight average molecular weight of 125,000.

Polybutylene succinate obtained was hot-pressed at 170° C. to prepare a film. The film had a thickness of 100 μm, tensile strength of 340 kg/cm² (yield), elongation of 420%, and melt tension of MT-value of 0.65(g) and TI-value of 6.5(g/10 min.).

The film was greatly deteriorated in the degradation test and strength of the film could not be measured after the degradation test.

Comparative Example 6
(Polyethylene)

Polyethylene [Milason-11 (Trade Mark)] was hot-pressed at 170° C. to prepare a film.

The film had following properties.

Thickness: 100 μ
Tensile strength: 220 kg/cm² (yield)
Elongation 500%
No change was observed after the degradation test.

What is claimed is:

1. A copolymer comprised of repeating structural units of the formula (1):

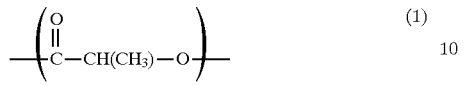

which is linked by an ester bond to one or more hydroxyl groups of polysaccharide and which further comprises repeating structural units of the formula (2):

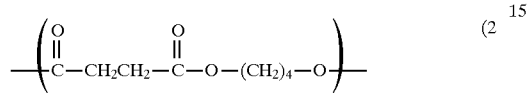

linked by an ester bond to the end of the repeating structural units of formula (1).

2. The copolymer of claim 1 wherein the polysaccharide is in an amount of 0.1 to 20% by weight, the repeating structural units of formula (1) are present in an amount of 36 to 96.9% by weight and the repeating structural units of formula (2) are present in an amount of 3.1 to 51% by weight.

3. A foam comprising a degradable copolymer obtained by conducting a dehydration polycondensation reaction of polysaccharide with one or more compounds selected from the group consisting of:
   (i) hydroxycarboxylic acid,
   (ii) polyhydroxycarboxylic acid,
   (iii) aliphatic polyhydric alcohol and aliphatic polybasic acid, and
   (iv) aliphatic polyester derived from aliphatic polyhydric alcohol and aliphatic polybasic acid.

4. A blow formed item comprising the degradable copolymer obtained by conducting a dehydration polycondensation reaction of polysaccharide with one or more compounds selected from the group consisting of:
   (i) hydroxycarboxylic acid,
   (ii) polyhydroxycarboxylic acid,
   (iii) aliphatic polyhydric alcohol and aliphatic polybasic acid, and
   (iv) aliphatic polyester derived from aliphatic polyhydric alcohol and aliphatic polybasic acid.

5. A process for preparing a degradable copolymer comprising: conducting a dehydration polycondensation reaction of polysaccharide and one or more compounds selected from the group consisting of:
   (i) hydroxycarboxylic acid,
   (ii) polyhydroxycarboxylic acid,
   (iii) aliphatic polyhydric alcohol and aliphatic polybasic acid, and
   (iv) aliphatic polyester derived from aliphatic polyhydric alcohol and aliphatic polybasic acid wherein the dehydration polycondensation reaction is carried out in the presence of a catalyst and an organic solvent in the substantial absence of water so as to prepare the degradable copolymer;
   removing at least a portion of the organic solvent from the reaction and introducing additional organic solvent having a moisture content less than or equal to the moisture content of the removed organic solvent so as to control the moisture content of the organic solvent in the reaction;
   treating the removed organic solvent with a drying agent so as to reduce the moisture content of the organic solvent to substantially less than the moisture content of the organic solvent in the reaction; and
   returning the treated organic solvent to the reaction.

6. The process of claim 5 wherein the drying agent is selected from the group consisting of an ion exchange resin, a molecular sieve, diphosphorus pentoxide and a metal hydride.

7. A degradable copolymer obtained by dehydration polycondensation of i) polysaccharide selected from the group consisting of cellulose ester and cellulose ether, ii) lactic acid and iii) aliphatic polyester selected from the group consisting of polyethylene succinate and polybutylene succinate, wherein said degradable copolymer has a melt tension of 5 or more.

* * * * *